US012706371B2

(12) United States Patent
Wu et al.

(10) Patent No.: US 12,706,371 B2
(45) Date of Patent: Aug. 11, 2026

(54) ANTENNA GROUNDING

(71) Applicant: Apple Inc., Cupertino, CA (US)

(72) Inventors: Jiangfeng Wu, San Jose, CA (US); Mei-Li Chi, San Jose, CA (US); Killian J Poore, San Jose, CA (US); Jason C Sauers, Sunnyvale, CA (US); Siwen Yong, San Francisco, CA (US); Yi Jiang, Cupertino, CA (US); Jing Zhu, Suzhou (CN); Lu Zhang, Shanghai (CN); Junying Liu, Shanghai (CN)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 18/293,027

(22) PCT Filed: Jun. 3, 2023

(86) PCT No.: PCT/CN2023/098177

§ 371 (c)(1),
(2) Date: Jan. 29, 2024

(87) PCT Pub. No.: WO2024/250126

PCT Pub. Date: Dec. 12, 2024

(65) Prior Publication Data

US 2025/0079687 A1 Mar. 6, 2025

(51) Int. Cl.
*H01Q 1/22* (2006.01)
*H01Q 1/50* (2006.01)
*H01Q 9/04* (2006.01)

(52) U.S. Cl.
CPC ............. *H01Q 1/2283* (2013.01); *H01Q 1/50* (2013.01); *H01Q 9/04* (2013.01)

(58) Field of Classification Search
CPC ........... H01Q 1/2283; H01Q 1/50; H01Q 9/04
See application file for complete search history.

(56) References Cited

U.S. PATENT DOCUMENTS 9,876,273 B2 1/2018 Lui et al.
11,417,951 B2 * 8/2022 Jiang ........................ H01Q 9/42
(Continued)

FOREIGN PATENT DOCUMENTS

CN 101800361 A 8/2010
CN 104506675 A 4/2015
(Continued)

*Primary Examiner* — Hai V Tran
(74) *Attorney, Agent, or Firm* — Treyz Law Group, P.C.; Michael H. Lyons

(57) ABSTRACT

An electronic device may have first and second rear-facing displays, a front-facing display, a cover at a front side overlapping the front-facing display, and an antenna that radiates through the cover. The cover may have a three-dimensional curvature. The device may have an inner chassis and an outer chassis. The antenna may include a radiating element and a ground trace on a flexible printed circuit. To maximize wireless performance of the antenna, the ground trace may be electrically coupled to as much conductive material in the vicinity of the antenna as possible. For example, the ground trace may be grounded to conductive structures in the front-facing display via a conductive cavity for the antenna, may be grounded directly to the outer chassis using conductive screws, and/or may be grounded directly to the inner chassis using conductive screws.

20 Claims, 17 Drawing Sheets

(56) References Cited

U.S. PATENT DOCUMENTS

| | | | | |
|---|---|---|---|---|
| 11,862,838 | B2 | 1/2024 | Zhang et al. | |
| 2010/0321253 | A1* | 12/2010 | Ayala Vazquez ...... | H01Q 13/18 343/702 |
| 2012/0050114 | A1* | 3/2012 | Li .......................... | H01Q 1/243 343/702 |
| 2013/0300618 | A1* | 11/2013 | Yarga ..................... | H01Q 1/243 343/720 |
| 2023/0314808 | A1* | 10/2023 | Olson ................ | G02B 27/0189 359/630 |

FOREIGN PATENT DOCUMENTS

| | | | |
|---|---|---|---|
| CN | 105938933 | A | 9/2016 |
| WO | 2023034037 | A1 | 3/2023 |
| WO | 2023034074 | A1 | 3/2023 |

* cited by examiner

ANTENNA GROUNDING

FIELD

This relates generally to electronic devices, including electronic devices with wireless communications capabilities.

BACKGROUND

Electronic devices often have displays that are used to display images to users. Such devices can include head-mounted displays and can have wireless circuitry with antennas. It can be challenging to incorporate antennas that exhibit satisfactory levels of wireless performance into head-mounted displays.

SUMMARY

A head-mounted device may have a housing. The housing may have an inner conductive chassis mounted to an outer conductive chassis. A logic board may be mounted to the inner conductive chassis. Left and right displays may be mounted to the logic board and may display images at a rear of the device. A cover may be mounted to the outer conductive chassis at the front of the device. The cover may have a compound or three-dimensional curvature. A front-facing display may be mounted to the cover and may display images through the cover. The cover may have a peripheral region laterally surrounding the front-facing display.

The device may have wireless circuitry with an antenna. The antenna may be mounted to the cover and may overlap the peripheral region. The antenna may radiate through the cover. The antenna may have an antenna resonating element and an antenna ground. The antenna resonating element may be mounted against an interior surface of the cover or may be embedded within the cover. The antenna ground may include a ground trace. The antenna resonating element and the ground trace may be disposed on a flexible printed circuit.

A conductive interconnect such as a conductive screw may couple the flexible printed circuit to the outer conductive chassis to short the ground trace directly to the outer conductive chassis. If desired, the flexible printed circuit may also be mechanically coupled to the inner conductive chassis using a rigid carrier and a biasing member. The biasing member may press the antenna resonating element against the cover. If desired, the flexible printed circuit may be wrapped around the rigid carrier and the biasing member and the conductive screw may couple the flexible printed circuit to the inner chassis. In these configurations, the conductive screw may short the ground trace directly to the inner conductive chassis.

If desired, the antenna may be a cavity-backed antenna having a conductive cavity formed from folded or bent sheet metal. The antenna resonating element may be disposed between the conductive cavity and the cover. The conductive cavity may be mounted to the logic board. The conductive cavity may be shorted to ground traces on the logic board. A conductive gasket may short the conductive cavity to conductive structures in the front-facing display. The antenna may be fed by a coaxial cable that is coupled to ground at one or more points nearby the antenna. By grounding the antenna in these ways, the radio-frequency performance of the antenna may be optimized given the curvature of the cover, the presence of the inner conductive chassis, the outer conductive chassis, and the front-facing display, and the communications requirements of the device.

DETAILED DESCRIPTION

Electronic devices may be provided with components such as antennas. The electronic devices may include portable electronic devices, wearable devices, desktop devices, embedded systems, and other electronic equipment. Illustrative configurations in which the electronic devices include a head-mounted device may sometimes be described herein as an example. The head-mounted device may have first and second rear-facing displays and a front-facing display. The device may have a housing with a cover at a front side of the device. The cover may have a central region overlapping the front-facing display and a peripheral region surrounding the central region. The cover may have a compound three-dimensional curvature.

The device may include an outer conductive chassis and an inner conductive chassis. A main logic board may be mounted to the inner conductive chassis. The first and second rear-facing displays may be mounted to the logic board. The device may include wireless circuitry with an antenna mounted against the cover. The antenna may have an antenna resonating element pressed against the cover. The antenna may have an antenna ground that includes a ground trace. The antenna resonating element and the ground trace may be disposed on a flexible printed circuit.

To maximize wireless performance of the antenna given the presence of the front-facing display, the outer conductive chassis, the inner conductive chassis, and the compound curvature of the cover, the ground trace may be electrically coupled to as much conductive material in the vicinity of the antenna as possible. For example, the ground trace may be coupled to the outer conductive chassis using a conductive screw. As another example, the ground trace may be coupled to the inner conductive chassis using a conductive screw. As another example, the antenna may be a cavity-backed antenna having a conductive can formed from folded sheet metal. The conductive can may be coupled to the ground trace using solder and may be coupled to conductive structures in the front-facing display using a conductive gasket.

Figure 1:
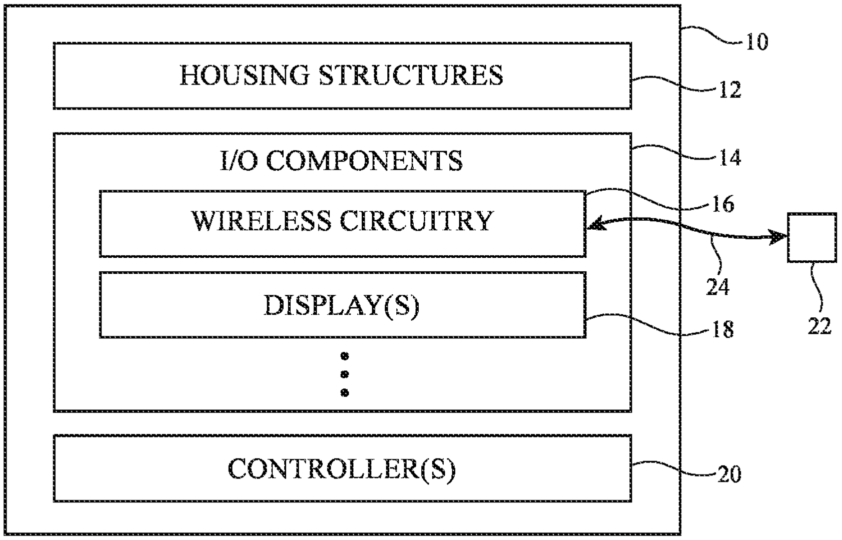
FIG. 1 is a schematic diagram of components in an illustrative electronic device in accordance with some embodiments.

FIG. 1 shows an illustrative electronic device 10. Device 10 may be operated in a system that includes external equipment 22 other than device 10. In some implementations that are described herein as an example, device 10 may include a head-mounted device (sometimes referred to herein as a head-mounted display device or simply a head-mounted display). If desired, device 10 may include a portable electronic device such as a laptop computer, a tablet computer, a media player, a cellular telephone, or a wearable electronic device such as a wristwatch, a pendant or bracelet, headphones, an earpiece, a headset, or other small portable device. Device 10 may also be larger device such as a desktop computer, display with or without an integrated computer, a set-top box, or a wireless access point or base station. If desired, device 10 may be integrated into a larger device or system such as a piece of furniture, a kiosk, a building, or a vehicle.

As shown in FIG. 1, device 10 may include a housing formed from one or more housing structures 12 (sometimes referred to herein as housing members 12). In implementations where device 10 is a head-mounted device, housing structures 12 may include support structures that are mountable or wearable on a user's head (sometimes referred to herein as head-mounted support structures), thereby allowing a user to wear device 10 while using or operating device 10.

The head-mounted support structures in housing structures 12 may have the shape of glasses or goggles and may support one or more lenses that align with one or more of the user's eyes while the user is wearing device 10. The head-mounted support structures in housing structures 12 may include one or more rigid frames that help to provide mechanical integrity, rigidity, and/or strength to device 10 during use. In some implementations that are described herein as an example, the one or more rigid frames are formed from conductive material. The rigid frame(s) may therefore sometimes be referred to herein as conductive frame(s).

If desired, housing structures 12 may include other housing structures or housing members disposed on (e.g., layered on or over, affixed to, etc.) and/or overlapping some or all of the conductive frame(s) (e.g., dielectric structures, rubber structures, ceramic structures, glass structures, fiber composite structures, foam structures, sapphire structures, plastic structures, cosmetic structures, etc.). These other housing structures may, for example, support one or more components in device 10, may help to protect the components of device 10 from damage or contaminants, may help to allow device 10 to be worn comfortably on the user's head, may help to hide portions of the conductive frame from view, may contribute to the cosmetic or aesthetic appearance of device 10, etc.

Device 10 may include input/output (I/O) components such as I/O components 14. I/O components 14 may allow device 10 to provide output and/or other information to the user of device 10 or other entities and/or may allow device 10 to receive user input and/or other information from the user and/or other entities. I/O components 14 may include one or more displays such as displays 18. Displays 18 may emit light (sometimes referred to herein as image light) that is provided to the user's eyes for viewing. The light may contain images. The images may contain pixels. Many images may be provided over time in a sequence (e.g., as a video). The displays 18 in device 10 may include, for example, left and right displays. The left display may provide light to a user's left eye whereas the right display may provide light to the suer's right eye while the user wears device 10 on their head.

I/O components 14 may also include wireless circuitry such as wireless circuitry 16 (sometimes referred to herein as wireless communication circuitry 16). Wireless circuitry 16 may transmit radio-frequency signals 24 to external equipment 22 and/or may receive radio-frequency signals 24 from external equipment 22. External equipment 22 may include another device such as device 10 (e.g., another head-mounted device, a desktop computer, a laptop computer, a cellular telephone, a tablet computer, a tethered computer, etc.), a peripheral device or accessory device (e.g., a user input device, a stylus, a device that identifies user inputs associated with gestures or motions made by a user, a gaming controller, headphones, etc.), remote computing equipment such as a remote server or cloud computing segment, a wireless base station, a wireless access point, and/or any other desired equipment with wireless communications capabilities. In implementations that are described herein as an example, external equipment 22 includes at least first and second peripheral devices such as left and right headphone speakers or earbuds. The earbuds may be worn by a user to provide audio content to the user's ears while the user is wearing device 10 on their head. Wireless circuitry 16 may transmit the audio content to the earbuds using radio-frequency signals 24.

I/O components 14 may also include other components (not shown) such as sensors, haptic output devices (e.g., one or more vibrators), non-display light sources such as light-emitting diodes, audio devices such as speakers for producing audio output, wireless charging circuitry for receiving wireless power for charging a battery on device 10 and/or for transmitting wireless power for charging a battery on other devices, batteries and/or other energy storage devices, buttons, mechanical adjustment components (e.g., components for adjusting one or more housing structures 12 to allow device 10 to be worn comfortably on a user's head and/or on other user's heads, which may have different geometries), and/or other components.

Sensors in I/O components 14 may include image sensors (e.g., one or more visible and/or infrared light cameras, binocular three-dimensional image sensors that gather three-dimensional images using two or more cameras in a binocular configuration, sensors that emit beams of light and that use two-dimensional image sensors to gather image data for three-dimensional images from light spots that are produced when a target is illuminated by the beams, light detection and ranging (lidar) sensors, etc.), acoustic sensors such as microphones or ultrasonic sensors, gaze tracking sensors (e.g., an optical system that emits one or more beams of infrared light that are tracked using the image sensor after reflecting from a user's eyes while wearing device 10), touch sensors, force sensors (e.g., capacitive force sensors, strain gauges, resistive force sensors, etc.), proximity sensors (e.g., capacitive proximity sensors and/or optical proximity sensors), ambient light sensors, contact sensors, pressure sensors, moisture sensors, gas sensors, magnetic sensors, motion sensors for sensing motion, position, and/or orientation (e.g., gyroscopes, accelerometers, compasses, and/or inertial measurement units (IMUs) that include two or more of these), and/or any other desired sensors.

Device 10 may also include one or more controllers 20 (sometimes referred to herein as control circuitry 20). Controller(s) 20 may include processing circuitry and storage circuitry. The processing circuitry may be used to control the operation of device 10 and may include one or more processors such as microprocessors, digital signal processors, microcontrollers, host processors, application specific integrated circuits, baseband processors, graphics processing units, central processing units (CPUs), etc. The storage circuitry in controller(s) 20 may include one or more hard disks or hard drives storage, nonvolatile memory (e.g., electrically-programmable-read-only memory configured to form a solid-state drive), volatile memory (e.g., static or dynamic random-access-memory), etc. If desired, controller(s) 20 may be configured to perform operations in device 10 using hardware (e.g., dedicated hardware or circuitry), firmware, and/or software. Software code for performing operations in device 10 may be stored on storage and may be executed by processing circuitry in controller(s) 20.

Controller(s) 20 run software on device 10 such as one or more software applications, internet browsers, gaming programs, voice-over-internet-protocol (VOIP) telephone call applications, social media applications, driving or navigation applications, email applications, media playback applications, operating system functions, etc. To support interactions with external equipment 22, controller(s) 20 may implement one or more communications protocols associated with (wireless) radio-frequency signals 24. The communications protocols may include internet protocols, wireless local area network protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols, IEEE 802.15.4 ultra-wideband communications protocols or other ultra-wideband communications protocols, non-Bluetooth protocols for ultra-low-latency audio streaming, etc. Each communications protocol may be associated with a corresponding radio access technology (RAT) that specifies the physical connection methodology used in implementing the protocol.

During operation, wireless circuitry 16 may be used to support communication between device 10 and external equipment 22 (e.g., using radio-frequency signals 24). For example, device 10 and/or external device 22 may transmit video data, application data, audio data, user input commands, and/or other data to each other (e.g., in one or both directions). If desired, device 10 and/or external equipment 22 may use wired and/or wireless communications circuitry to communicate through one or more communications networks (e.g., the internet, local area networks, etc.). If desired, device 10 may communicate with other end hosts over the internet via radio-frequency signals 24 and external equipment 22. Wireless circuitry 16 may allow data to be received by device 10 from external equipment 22 and/or to provide data to external equipment 22.

While controller(s) 20 are shown separately from wireless circuitry 16 for the sake of clarity, wireless circuitry 16 may include processing circuitry and/or storage circuitry that forms part of controller(s) 20 (e.g., portions of controller(s) 20 may be implemented on wireless circuitry 16). As an example, controller(s) 20 may include baseband circuitry (e.g., one or more baseband processors), digital control circuitry, analog control circuitry, and/or other control circuitry that forms part of wireless circuitry 16. The baseband circuitry may, for example, access a communication protocol stack on controller(s) 20 to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Figure 2:
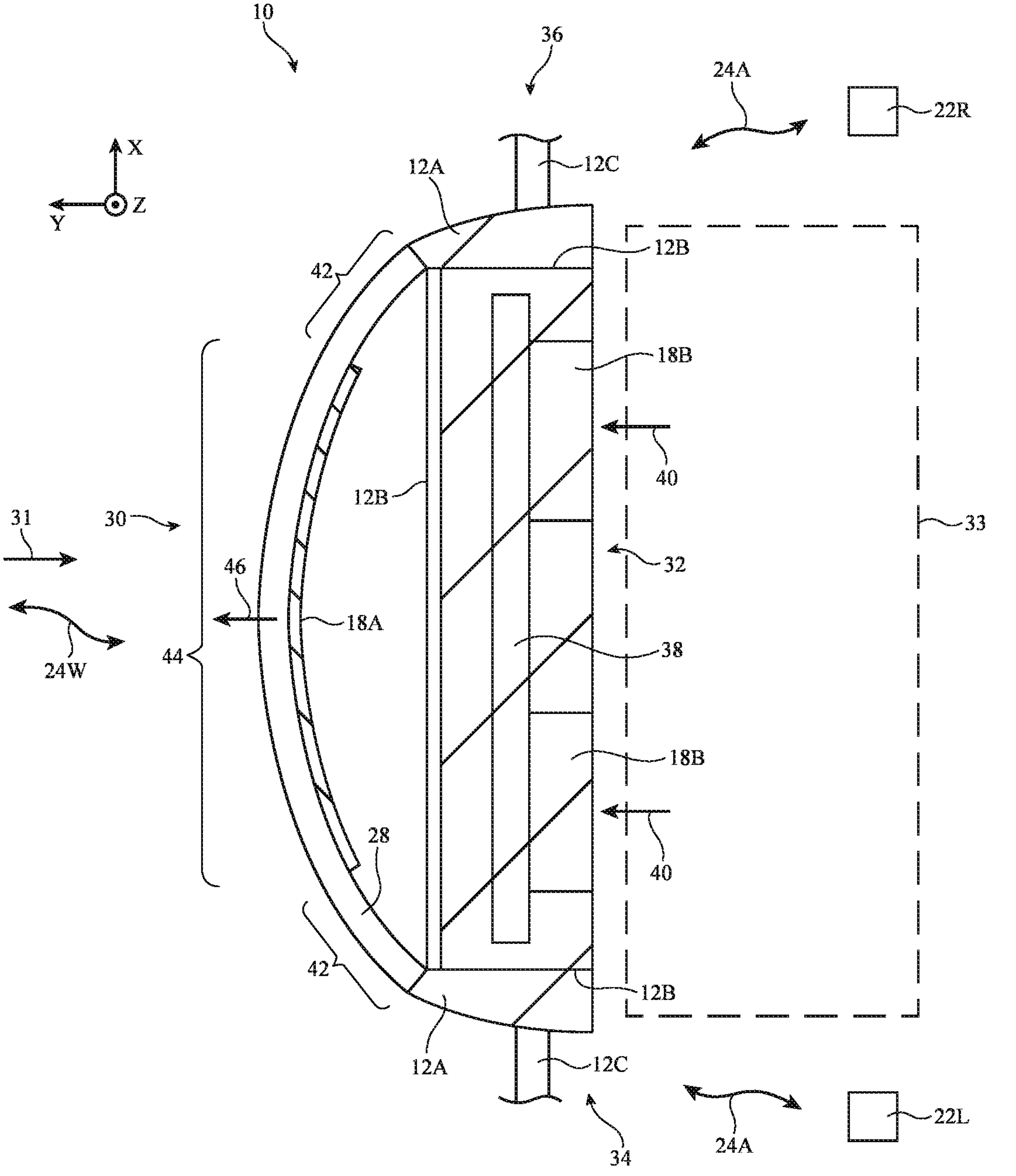
FIG. 2 is a cross-sectional top view of an illustrative electronic device in accordance with some embodiments.

FIG. 2 is a top view of device 10. In the example of FIG. 2, device 10 is a head-mounted device. In general, device 10 may be any suitable electronic equipment. As shown in FIG. 2, device 10 may include housing structures 12. Housing structures 12 may be configured to be worn on a user's head. Housing structures 12 may have curved head-shaped surfaces, a nose-bridge portion that is configured to rest on a user's nose when device 10 is on a user's head, may have a headband such as strap 12C for supporting device 10 on the user's head, and/or may have other features that allow device 10 to be worn by a user.

Housing structures 12 may include one or more frame members such as outer chassis 12A and inner chassis 12B. Outer chassis 12A may be an outer frame surrounding the interior of device 10 and may, if desired, form exterior surfaces of device 10 (e.g., portions of outer chassis 12A may form one or more housing walls of device 10 such as housing walls that run around a periphery of device 10). Inner chassis 12B may be disposed within the interior of device 10 and may be mounted to outer chassis 12A (e.g., outer chassis 12A may surround the lateral periphery of inner chassis 12B in the X-Z plane). Strap 12C may be attached to outer chassis 12A at right side 36 of device 10 and left side 34 of device 10 (e.g., using attachment structures such as a joint, a hinge, screws, fasteners, snaps, magnets, etc.). Strap 12C may be permanently attached to outer chassis 12A or may be removable. Right side 36 may sometimes be referred to herein as right edge 36, right face 36, or right wall 36 of device 10. Left side 34 may extend opposite right side 36 and may sometimes be referred to herein as left edge 34, left face 34, or left wall 34 of device 10. Right side 36 and left side 34 may extend from front side 30 to rear side 32 of device 10.

Outer chassis 12A may be formed from conductive material such as aluminum, stainless steel, or titanium. Outer chassis 12A may therefore sometimes be referred to herein as conductive chassis 12A, conductive outer chassis 12A, outer conductive chassis 12A, conductive outer frame 12A, conductive frame 12A, conductive housing 12A, conductive outer housing 12A, or outer housing 12A. If desired, inner chassis 12B may be formed from a different conductive material than outer chassis 12A (e.g., to meet mounting requirements for the inner chassis, to meet protective requirements for the outer chassis, to meet requirements on mechanical strength and integrity, and minimize device weight). Inner chassis 12B may, for example, be formed from conductive material such as magnesium, aluminum, stainless steel, or titanium. Inner chassis 12B may therefore sometimes be referred to herein as conductive chassis 12B, conductive inner chassis 12B, inner conductive chassis 12B, conductive inner frame 12B, conductive frame 12B, conductive housing 12B, conductive inner housing 12B, inner housing 12B, or conductive support plate 12B.

Outer chassis 12A and inner chassis 12B may provide mechanical support and rigidity for device 10. In addition, one or more components within the interior of device 10 may be mounted or affixed to outer chassis 12A and/or inner chassis 12B. For example, a substrate such as logic board 38 may be mounted to inner chassis 12B. Logic board 38 may, for example, form a main logic board (MLB) for device 10. Other components in device 10 (e.g., portions of I/O components 14 and/or controller(s) 20 of FIG. 1) may be mounted to and/or formed within logic board 38. For example, one or more rear/user facing such as displays 18B may be mounted to logic board 38. Displays 18B may face rear side 32 of device 10. Rear side 32 may sometimes also be referred to herein as rear edge 32, rear wall 32, or rear face 32.

When device 10 is worn on a user's head, the user's head 33 faces rear side 32 of device 10 and the user's eyes are aligned with displays 18B, as shown by arrows 40. Displays 18B may include a left display that aligns with the user's left eye and a right display that aligns with the user's right eye (e.g., the user's left and right eyes may be located within left and right eye boxes of displays 18B). The left and right displays may include respective pixel arrays (or a single shared pixel array) and optics (e.g., one or more lenses) for directing images from the pixel arrays to the user's eyes (e.g., as binocularly fusible content).

The housing structures 12 of device 10 may also include housing structures at the front side 30 of device 10 opposite rear side 32. Front side 30 may sometimes also be referred to herein as front edge 30, front wall 30, or front face 30 of device 10. Housing structures 12 may include a cover glass assembly (CGA) 28 mounted to outer chassis 12A at front side 30 of device 10. CGA 28 may sometimes also be referred to herein as cover 28, front cover 28, or dielectric cover 28 of device 10. CGA 28 may be fully or partially transparent.

CGA 28 may include multiple layers (sometimes referred to herein as cover layers). For example, CGA 28 may include an outer cover layer for device 10 such as a glass cover layer (sometimes referred to herein as a display cover layer or a cover glass). The glass cover layer may form the exterior surface of device 10 at front side 30. CGA 28 may also include one or more dielectric layers behind and overlapping the glass cover layer (e.g., at an interior side of the glass cover layer). The dielectric layer(s) may include one or more polymer layers, plastic layers, glass layers, ceramic layers, and/or other dielectric layers. If desired, some or all of the dielectric layer(s) may be formed in a ring shape that runs along the periphery of CGA 28 in the X-Z plane and the glass cover layer (e.g., at peripheral edge portions 42 of CGA 28) or may overlap substantially all of the glass cover layer. The dielectric layer(s) behind the glass cover layer may sometimes also be referred to as a cover layer, dielectric member, dielectric cover layer, shroud, trim, and/or canopy. Peripheral edge portions 42 may sometimes also be referred to herein as peripheral region 42 or edge region 42.

CGA 28 may also include a forward-facing display such as display 18A (e.g., a flexible display panel formed from a pixel array based on organic light-emitting diodes or other display panel). CGA 28 may have a central portion or region 44 that overlaps display 18A. Peripheral edge portions 42 of CGA 28 may extend around the lateral periphery of CGA 28 and central region 44. Display 18A may emit light (e.g., images) through central region 44 of the dielectric layer(s) and the glass cover layer of CGA 28 (as shown by arrow 46) for view by persons other than the wearer of device 10. The central region 44 of the glass cover layer and the dielectric layer(s) of CGA 28 that overlap display 18A may be fully transparent or partly transparent to help hide display 18A from view when the display is not emitting light. The peripheral edge regions 42 of the glass cover layer and the dielectric layer(s) of CGA 28 may be opaque or transparent. Display 18A may sometimes be referred to herein as a front-facing display or a publicly viewable display.

Housing structures 12 may also include cosmetic covering members, polymer layers (e.g., fully or partly transparent polymer layers), and/or dielectric housing walls layered onto or over outer chassis 12A (e.g., at the exterior of device 10) if desired. Housing structures 12 may also include one or more fabric members, rubber members, ceramic members, dielectric members, curtain members, or other structures at rear side 32 of device 10 that help to accommodate the user's face while wearing device 10 and/or to block external, ambient, or scene light from the environment around the user from interfering with the light from displays 18B being viewed by the user.

Some or all of the lateral surface of CGA 28 may exhibit a curved cross-sectional profile. Within CGA 28, some or all of one or more lateral surfaces of the glass cover layer and/or some or all of one or more of the lateral surfaces of the dielectric layer(s) in CGA 28 may be characterized by a three-dimensional curvature (e.g., spherical curvature, aspherical curvature, freeform curvature, etc.). The three-dimensional curvature may be a compound curvature (e.g., the surfaces exhibiting the curvature may be non-developable surfaces).

In the areas of compound curvature, at least some portions of the curved surface(s) in CGA 28 may be characterized by a radius of curvature R of 4 mm to 250 mm, 8 mm to 200 mm, 10 mm to 150 mm, at least 5 mm, at least 12 mm, at least 16 mm, at least 20 mm, at least 30 mm, less than 200 mm, less than 100 mm, less than 75 mm, less than 55 mm, less than 35 mm, and/or other suitable amount of curvatures. The compound curvature may be, for example, a three-dimensional curvature in which the surface(s) have non-zero radii of curvature about two or more different axes (e.g., non-parallel axes, intersecting axes, non-intersecting axes, perpendicular axes such as the X-axis and Z-axis, etc.) and/or two or more different points within or behind device 10. If desired, one or more of the surfaces of the dielectric layer(s) in CGA 28 may be a developable surface. Display 18A may be a flexible display panel that is bent into a curved shape (e.g., a curved shape following the curved face of a user, a curved shape following the compound curvature of CGA 28, a curved shape characterized by inner and outer developable surfaces, etc.). The compound curvature may serve to provide device 10 with an attractive cosmetic appearance, may help device 10 to exhibit a compact and light weight form factor, may serve to maximize the mechanical strength of device 10, and/or may accommodate easy interaction with device 10 by the user, as examples.

During operation, device 10 may receive image data (e.g., image data for video, still images, etc.) and may present this information on displays 18B and/or 18A. Device 10 may also receive other data, control commands, user input, etc. Device 10 may also transmit data to accessories and other electronic equipment (e.g., external equipment 22 of FIG. 1). For example, image data from a forward-facing camera may be provided to an associated device, audio output may be provided to a device with speakers such as a headphone device, user input and sensor readings may be transmitted to remote equipment, etc.

Communications such as these may be supported using wired and/or wireless communications. In an illustrative configuration, wireless circuitry 16 (FIG. 1) may support wireless communications between device 10 and remote wireless equipment such as external equipment 22 of FIG. 1 (e.g., a cellular telephone, a wireless base station, a computer, headphones or other accessories, a remote control, peer devices, internet servers, and/or other equipment). Wireless communications may be supported using one or more antennas in device 10 and in the external equipment operating at one or more wireless communications frequencies. The antennas may be coupled to wireless transceiver circuitry. The wireless transceiver circuitry may include transmitter circuitry configured to transmit wireless communications signals using the antenna(s) and receiver circuitry configured to receive wireless communications signals using the antenna(s).

External equipment 22 of FIG. 1 may include at least a first accessory or peripheral device 22L and a second accessory or peripheral device 22R, as shown in the example of FIG. 2. Peripheral devices 22R and 22L may, for example, be control input devices (e.g., remote controls, gaming controllers, etc.) or audio output devices such as right and left speakers, right and left speakers of headphones worn by the user, etc. In implementations that are described herein as an example, peripheral device 22R is a right earbud and peripheral device 22L is a left earbud. Peripheral device 22R may therefore sometimes be referred to herein as right earbud 22R and peripheral device 22L may sometimes be referred to herein as left earbud 22L.

While operating device 10, the user wears device 10 on head 33. At the same time, the user wears left earbud 22L on and/or within their left ear (at the left side of head 33) and wears right earbud 22R on and/or within their right ear (at the right side of head 33). Earbuds 22L and 22R may each include a speaker, a battery, one or more processors, and wireless circuitry having one or more antennas. Earbuds 22L and 22R may be wireless earbuds having batteries that are rechargeable when earbuds 22L and 22R are plugged into a power adapter, placed on or within a charging dock, or placed within a charging case, for example.

One or more antennas in device 10 may transmit audio data in radio-frequency signals 24A to earbuds 22R and 22L. Earbuds 22L and 22R may play the audio data over the speakers in earbuds 22L and 22R. The audio data may include a first stream of audio data (e.g., left audio data) for playback by left earbud 22L and a second, different, stream of audio data (e.g., right audio data) for playback by right earbud 22R (e.g., to provide the user with stereo, three-dimensional, spatial, and/or surround sound). One or more antennas in device 10 may also convey other wireless data in radio-frequency signals 24W.

Additionally or alternatively, one or both of earbuds 22L and 22R may include one or more sensors that generate sensor data. The sensors may include a microphone, a touch sensor, a force sensor, an orientation sensor (e.g., a gyroscope, inertial measurement unit, motion sensor, etc.), an ambient light sensor, a proximity sensor, a magnetic sensor, a temperature sensor, and/or other sensors. The microphone may generate microphone data (e.g., voice data from the user speaking while wearing the earbuds). The touch sensor may generate touch sensor data and the force sensor may generate force sensor data (e.g., indicative of a user input provided to device 10 via the earbuds, indicative of the earbuds being presently located in the ears of the user, etc.). The ambient light sensor may generate ambient light sensor data (e.g., indicative of the location of device 10 and/or lighting conditions around the user). In general, the sensors may generate any desired sensor data. Earbuds 22L and 22R may transmit the sensor data to one or more antennas in device 10 using radio-frequency signals 24A and/or using radio-frequency signals 24W.

Figure 3:
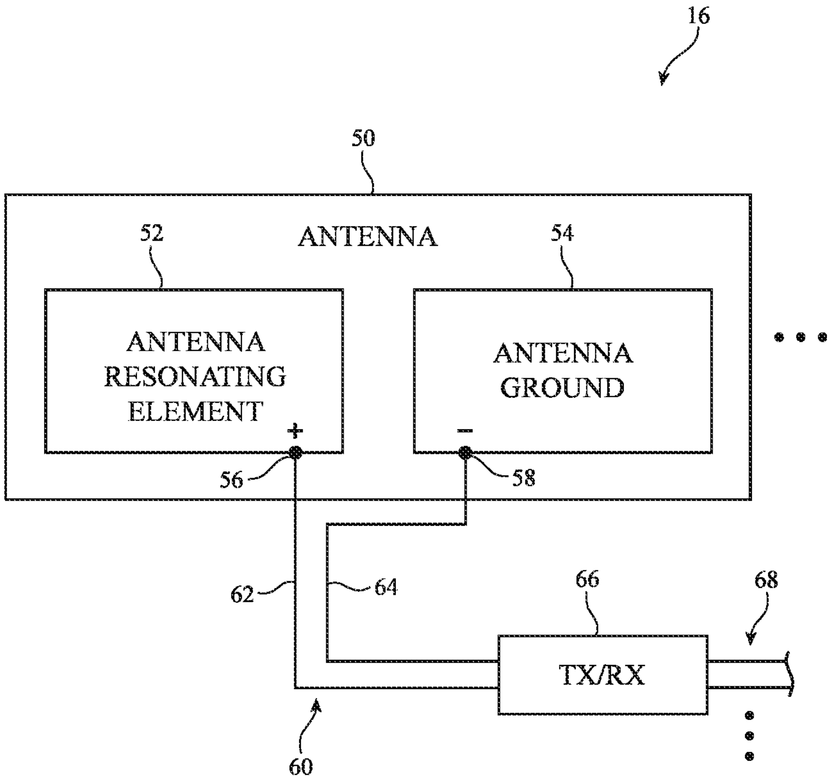
FIG. 3 is a schematic diagram of illustrative wireless circuitry having an antenna in accordance with some embodiments.

FIG. 3 is a diagram of illustrative components in wireless circuitry 16 of device 10. As shown in FIG. 3, wireless circuitry 16 may include one or more transceivers (e.g., transceiver circuitry) such as transceiver (TX/RX) 66. Transceiver 66 may handle transmission and/or reception of radio-frequency signals 24 (e.g., radio-frequency signals 24A or 24W of FIG. 2) within corresponding frequency bands at radio frequencies (sometimes referred to herein as communications bands or simply as bands).

The frequency bands handled by transceiver 66 may include wireless personal area network (WPAN) frequency bands such as the 2.4 GHz Bluetooth® band or other WPAN communications bands, cellular telephone communications bands such as a cellular low band (600-960 MHz), a cellular low-midband (1400-1550 MHz), a cellular midband (1700-2200 MHz), a cellular high band (2300-2700 MHZ), a cellular ultra-high band (3300-5000 MHz), or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHZ WLAN band (e.g., from 5180 to 5825 MHZ), a Wi-Fi® 6E band (e.g., from 5925-7125 MHz), and/or other Wi-Fi® bands (e.g., from 1875-5160 MHz), near-field communications frequency bands (e.g., at 13.56 MHz), satellite navigation frequency bands such as the Global Positioning System (GPS) bands, Global Navigation Satellite System (GLONASS) bands, and BeiDou Navigation Satellite System (BDS) bands, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands, unlicensed bands such as an unlicensed band at 2.4 GHz and/or an unlicensed band between 5-6 GHZ, emergency and/or public services bands, and/or any other desired frequency bands of interest. Transceiver 66 may also be used to perform spatial ranging operations if desired (e.g., using a radar scheme).

As shown in FIG. 3, wireless circuitry 16 may also include one or more antennas 50. Transceiver 66 may convey (e.g., transmit and/or receive) radio-frequency signals 24 using one or more antennas 50. Each antenna 50 may include one or more antenna conductors formed from conductive material such as metal. The antenna conductors may include an antenna resonating element 52 (sometimes referred to as an antenna resonator, an antenna radiator, or an antenna radiating element) and an antenna ground 54 (sometimes referred to as a ground plane).

Antenna 50 may have an antenna feed coupled between antenna resonating element 52 and antenna ground 54. The antenna feed may have a first (positive or signal) antenna feed terminal 56 coupled to antenna resonating element 52. The antenna feed may also have a second (ground or negative) antenna feed terminal 58 coupled to antenna ground 54. Antenna resonating element 52 may be separated from antenna ground 54 by a dielectric (non-conductive) gap. Antenna resonating element 52 and antenna ground 54 may be formed from separate pieces of metal or other conductive materials or may, if desired, be formed from separate portions of the same integral piece of metal. If desired, antenna 50 may include additional antenna conductors that are not coupled to antenna feed terminals 56 and 58 (e.g., parasitic elements).

Each antenna feed and thus each antenna 50 in wireless circuitry 16 may be coupled to one or more transceivers 66 in wireless circuitry 16 over a corresponding radio-frequency transmission line 60. Radio-frequency transmission line 60 may include a signal conductor such as signal conductor 62 (e.g., a positive signal conductor) and a ground conductor such as ground conductor 64. Ground conductor 64 may be coupled to antenna feed terminal 58 of antenna 50. Signal conductor 62 may be coupled to antenna feed terminal 56 of antenna 50. Radio-frequency transmission line 60 may include one or more of a stripline, microstrip, coaxial cable, coaxial probes, edge-coupled microstrip, edge-coupled stripline, waveguide, radio-frequency connector, combinations of these, etc. Radio-frequency transmission line 60 may also sometimes be referred to herein as a radio-frequency transmission line path. If desired, filter circuitry, tuning components, switching circuitry, impedance matching circuitry, phase shifter circuitry, amplifier circuitry, and/or other circuitry may be disposed on radio-frequency transmission line 60 and/or may be coupled between two or more of the antenna conductors in antenna 50.

The term "convey radio-frequency signals" as used herein means the transmission and/or reception of the radio-frequency signals (e.g., for performing unidirectional and/or bidirectional wireless communications with external wireless communications equipment). During transmission of radio-frequency signals 24, transceiver 66 transmits radio-frequency signals 24 (e.g., as modulated using wireless data such as audio data, control data, etc.) over radio-frequency transmission line 60. The radio-frequency signals may excite antenna currents to flow around the edges of antenna resonating element 52 and antenna ground 54 (via antenna feed terminals 56 and 58). The antenna currents may radiate radio-frequency signals 24 into free space (e.g., based at least on a resonance established by the radiating length of antenna resonating element 52 and/or antenna ground 54).

During the reception of radio-frequency signals 24 (e.g., as modulated by external equipment using wireless data such as voice data, sensor data, image data, etc.), incident radio-frequency signals 24 may excite antenna currents to flow around the edges of antenna resonating element 52 and antenna ground 54. The antenna currents may pass radio-frequency signals 24 to transceiver 66 over radio-frequency transmission line 60. Transceiver 66 may downconvert the radio-frequency signals to baseband and may demodulate wireless data from the signals (e.g., using baseband circuitry such as one or more baseband processors).

Antennas 50 may be formed using any suitable antenna structures. For example, antennas 50 may include antennas with antenna resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antenna structures, dipole antenna structures, Yagi (Yagi-Uda) antenna structures, surface integrated waveguide structures, hybrids of two or more of these designs, etc. If desired, one or more antennas 50 may be cavity-backed antennas. Two or more antennas 50 may be arranged in a phased antenna array if desired (e.g., for conveying centimeter and/or millimeter wave signals within a signal beam formed in a desired beam pointing direction that may be steered/adjusted over time). Earbuds 22R and 22L may also have wireless circuitry such as wireless circuitry 16 of FIG. 3.

Device 10 may include a first set of one or more antennas that convey radio-frequency signals 24A with earbuds 22R and 22L (FIG. 2). Device 10 may also include a second set of one or more antennas that convey radio-frequency signals 24W with other external equipment 22. Radio-frequency signals 24A may, for example, be conveyed through or towards rear side 32 of device 10, as shown in FIG. 2 (e.g., to and from the expected location of earbuds 22L and 22R while the user wears device 10). Radio-frequency signals 24W may be conveyed through front side 30 of device 10, through rear side 32, and/or through other sides of device 10. Radio-frequency signals 24A may be conveyed using a first radio access technology (RAT), a first communications protocol, a first transceiver in device 10, and/or a first set of frequencies or frequency bands. Radio-frequency signals 24W may be conveyed using a second RAT different from the first RAT, a second communications protocol different from the first communications protocol, a second transceiver in device 10 different from the first transceiver, and/or a second set of frequencies or frequency bands different from the first set of frequencies or frequency bands.

Figure 4:
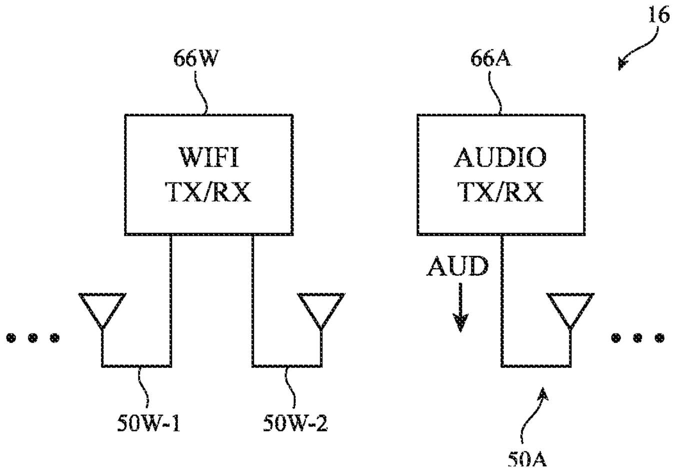
FIG. 4 is a circuit diagram of illustrative wireless circuitry having transceivers that convey radio-frequency signals using antennas in accordance with some embodiments.

FIG. 4 is a diagram showing how wireless circuitry 16 may include different components for conveying radio-frequency signals 24A and 24W. As shown in FIG. 4, wireless circuitry 16 may use at least one antenna 50A to convey radio-frequency signals 24A and May use at least two antennas 50W (e.g., at least a first antenna 50W-1 and a second antenna 50W-2) to convey radio-frequency signals 24W (FIG. 2). While radio-frequency signals 24A may, in general, convey any desired wireless data between device 10 and multiple peripheral devices, an implementation in which radio-frequency signals 24A convey audio data and sensor data between device 10 and earbuds 22L and 22R is described herein as an example.

Antennas 50W-1 and 50W-2 may be coupled to a first transceiver 66W over respective radio-frequency transmission lines. Antenna 50A may be coupled to a second transceiver 66A over a corresponding radio-frequency transmission line. Transceivers 66W and 66A may be formed using different respective radios, modems, chips, integrated circuits, integrated circuit (IC) packages, and/or modules. Transceiver 66W may convey radio-frequency signals 24W (FIG. 2) with external equipment other than earbuds 22R and 22L and/or with earbuds 22R and 22L using antennas 50W-1 and 50W-2. Transceiver 66W may, for example, have respective first and second transmit chains and respective first and second receive chains (e.g., respective first and second ports) coupled to antennas 50W-1 and 50W-2.

Transceiver 66W may convey radio-frequency signals 24W using at least a first communications protocol, at least a first RAT, and a first set of frequency bands. An implementation in which radio-frequency signals 24W include WLAN signals conveyed using a WLAN protocol (e.g., a Wi-Fi protocol), the WLAN RAT, and WLAN frequency bands is described herein as an example. If desired, radio-frequency signals 24W may also include Bluetooth signals conveyed using a Bluetooth protocol and Bluetooth frequency bands. Transceiver 66W may therefore sometimes be referred to herein as WLAN transceiver 66W, Wi-Fi transceiver 66W, or WLAN/Bluetooth transceiver 66W. Radio-frequency signals 24W may sometimes be referred to herein as WLAN or Wi-Fi signals 24W. This is merely illustrative and, in general, radio-frequency signals 24W may be conveyed using any desired protocol(s).

In some scenarios, Bluetooth signals conveyed by transceiver 66W are used to convey streams of audio data between device 10 and earbuds 22L and 22R. However, Bluetooth signaling can involve an excessive amount of latency and an excessive glitch rate. This can be disruptive to the user experience while listening to audio on earbuds 22L and 22R, particularly for audio data with a relatively high data rate (e.g., as required for immersive, high definition, three-dimensional audio presented to the user along with virtual reality content on displays 18B of FIG. 2). The high latency and excessive glitch rate associated with Bluetooth signaling may be caused by the Bluetooth protocol's requirement for time division duplexing between earbuds 22L and 22R (e.g., where audio data packets are transmitted to right earbud 22R and then to left earbud 22L in a time-alternating manner), frequency hopping between different Bluetooth frequencies, and a relatively large tolerance for packet retransmissions, for example.

To mitigate these issues, transceiver 66A may convey radio-frequency signals 24A (FIG. 2) using a second communications protocol, a second RAT, and a second set of frequency bands different from those used by transceiver 66W. For example, transceiver 66A may convey radio-frequency signals 24A using a non-Bluetooth, ultra-low-latency audio communications protocol optimized to support low latency and high data rate audio streaming from device 10 to earbuds 22L and 22R. Radio-frequency signals 24A may be conveyed in different frequency bands than radio-frequency signals 24W. For example, radio-frequency signals 24A may be conveyed using an unlicensed band at 2.4 GHz and/or an unlicensed band between 5-6 GHz. The band between 5-6 GHz may allow for a larger bandwidth than the 2.4 GHz band. In addition, the band between 5-6 GHz may allow for fewer coexistence/interference issues than the 2.4 GHz band, which coexists with the Bluetooth band, household appliances such as microwaves that emit around 2.4 GHz, etc.

The ultra-low-latency audio protocol may involve communications without performing time division duplexing between earbuds 22L and 22R and may involve communications with a lower packet re-transmission count limit, lower latency, lower glitch rate (e.g., 1 glitch per hour or fewer), more stability, and less interference than the Bluetooth protocol. Further, the ultra-low-latency audio protocol requires both earbuds 22R and 22L to convey radio-frequency signals 24A directly with device 10 rather than relaying signals or data between earbuds 22R and 2L and has a wireless fading channel selected to have a tighter distribution and shorter tail at the low power end than the Bluetooth protocol. Transceiver 66A may therefore sometimes be referred to herein as audio transceiver 66A. Radio-frequency signals 24A may sometimes be referred to herein as audio signals 24A. The example in which transceiver 66A conveys audio data is merely illustrative and, in general, transceiver 66A may use radio-frequency signals 24A to convey any desired wireless data.

During transmission, transceiver 66A may transmit audio data AUD in radio-frequency signals 24A (e.g., radio-frequency signals 24A may be modulated to carry audio data AUD). Antenna 50A may transmit the radio-frequency signals 24A including audio data AUD. Audio data AUD may include a stream of audio data packets. The stream of audio data packets may include a first set of audio data packets (or any desired first portion of the stream of audio data as distributed across one or more packets) for playback by left earbud 22L (e.g., a stream of left speaker audio data). The stream of audio data packets may also include a second set of audio data packets (or any desired second portion of the stream of audio data as distributed across one or more packets) for playback by right earbud 22R (e.g., a stream of right speaker audio data). The first and second sets may be interspersed or interleaved in time, for example.

Since the ultra-low-latency audio communications protocol governing transmission of radio-frequency signals 24A does not involve time division duplexing (TDD) between earbuds 22R and 22L, the same audio data AUD (e.g., the stream of audio data packets including both left and right speaker audio data) is concurrently (e.g., simultaneously) transmitted to both earbuds 22R and 22L and is concurrently received by both earbuds 22R and 22L. The controllers on earbuds 22R and 22L may demodulate the received audio data to recover the first and second sets of audio data packets. Left earbud 22L may then play the first set of audio data packets without playing (e.g., while discarding) the received second set of audio data packets. Right earbud 22R may play the second set of audio data packets without playing (e.g., while discarding) the received first set of audio data packets. Earbuds 22L and 22R may also transmit radio-frequency signals 24A to antenna 50A on device 10 to confirm/acknowledge receipt of audio data AUD, to convey voice/sensor data to device 10, etc. Since the sensor data gathered by earbuds 22R and 22L may not be subject to the same strict latency requirements as the audio data conveyed by transceiver 66A, earbuds 22L and 22R may, if desired, include additional wireless circuitry that transmits some or all of the sensor data to device 10 using the Bluetooth protocol or other protocols.

In some situations, using the same antenna 50A to convey radio-frequency signals 24A with both earbuds 22R and 22L can cause an excessive glitch rate due to random transmission nulls and the fading channel between antenna 50A and the earbuds. To improve link quality and glitch rate, wireless circuitry 16 may include different respective antennas 50A for conveying radio-frequency signals 24A with earbuds 22R and 22L, if desired.

Figure 5:
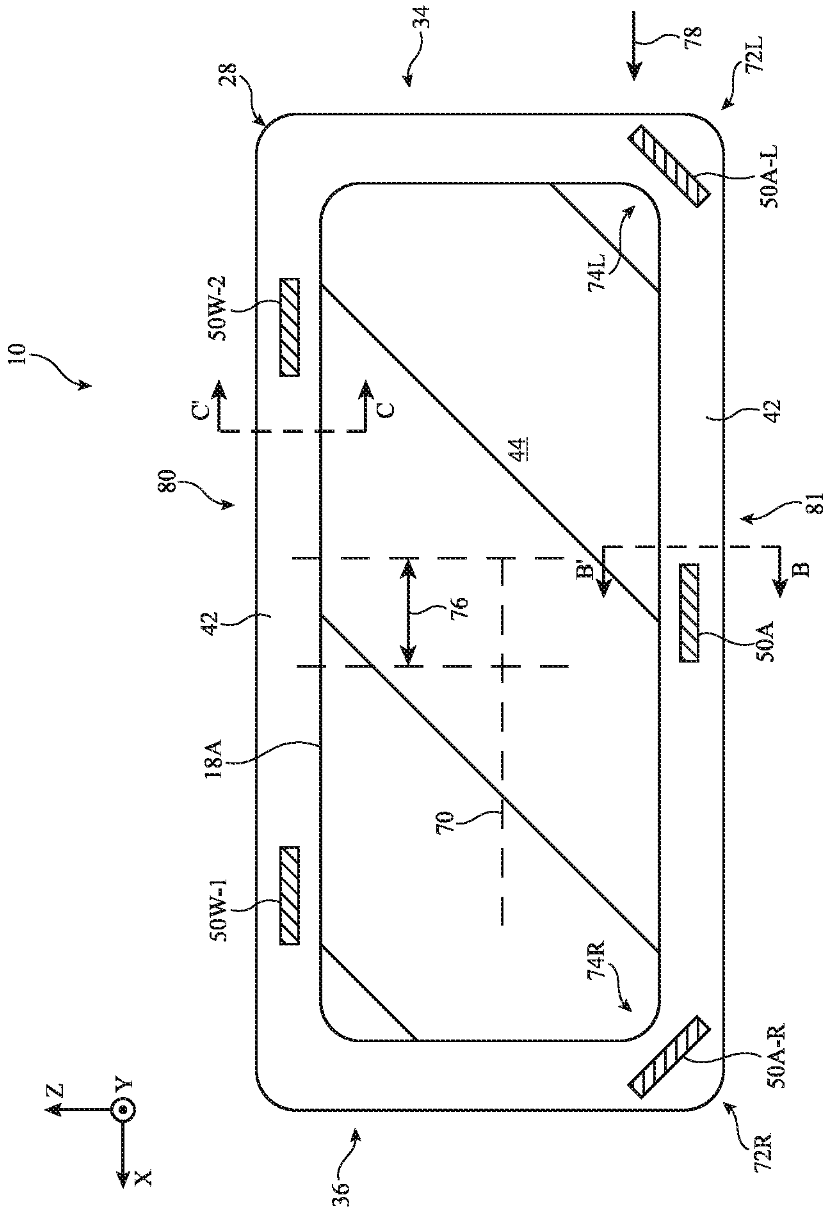
FIG. 5 is a front view of an illustrative electronic device having antennas disposed around the periphery of a cover glass assembly in accordance with some embodiments.

Given the compact and lightweight form factor of device 10 and the presence of conductive structures in device 10 such as outer chassis 12A, inner chassis 12B, conductive portions of logic board 38, displays 18B, and display 18A, it can be challenging to place antennas 50 at locations device 10 that allow the antennas to exhibit satisfactory levels of radio-frequency performance. To help maximize the wireless performance of antennas 50, antennas 50 may be mounted at the front of device 10 and may overlap peripheral edge portions 42 of CGA 28. FIG. 5 is a front view of device 10 (e.g., as taken in the direction of arrow 31 of FIG. 2) showing how antennas 50 may be mounted at the front of device 10 and overlapping peripheral edge portions 42 of CGA 28.

As shown in FIG. 5, the front-facing display 18A on device 10 may overlap central region 44 of CGA 28 but not peripheral edge portions 42 of CGA 28. Display 18A (central region 44) may be laterally surrounded by peripheral edge portions 42 of CGA 28. In other words, peripheral edge portions 42 may extend around the lateral periphery of display 18A (e.g., when viewed in the X-Z plane). Peripheral edge portions 42 may, for example, form an inactive (conductor-free) portion of CGA 28 that extends around or along the lateral periphery of CGA 28, central region 44 of CGA 28, and display 18A.

Device 10 may have a top side 80 and a bottom side 81 opposite top side 80. Top side 80 may sometimes also be referred to herein as top edge 80, top wall 80, or top face 80 of device 10. Bottom side 81 may sometimes also be referred to herein as bottom edge 81, bottom wall 81, or bottom face 81 of device 10. Right side 36 and left side 34 may extend from top side 80 to bottom side 81 of device 10.

Device 10 may have corners 72 such as a bottom-right corner 72R where right side 36 meets bottom side 81 and a bottom-left corner 72L where left side 34 meets bottom side 81. Display 18A may have corners 74 such as a bottom-right corner 74R facing corner 72R of device 10 and a bottom-left corner 74L facing corner 74L of device 10.

The housing structures of device 10 may have a nose bridge portion such as nose bridge region 85. Nose bridge region 85 may rest on the user's nose while wearing device 10 on their head. Nose bridge region 85 may be laterally interposed between the left and right displays 18B in device 10 (FIG. 2), for example. Nose bridge region 85 may vertically extend from top side 80 to bottom side 81 at the center of device 10.

Display 18A may include pixel circuitry and other conductive components that can block radio-frequency signals conveyed by the antennas in device 10. As such, antennas 50W-1, 50W-2, and one or more antennas 50A may be disposed within device 10 at locations overlapping peripheral edge portions 42 of CGA 28. As shown in FIG. 5, antennas 50W-1 and 50W-2 may be mounted within device 10 and overlapping an upper region or area of peripheral edge portions 42 (e.g., antennas 50W-1 and 50W-2 may be interposed between display 18A and top side 80 of device 10).

Antennas 50W-1 and 50W-2 may convey radio-frequency signals 24W through the dielectric material in CGA 28 and/or the top, bottom, right, left, and/or rear sides of device 10. Antennas 50W-1 and 50W-2 may be disposed at opposing sides of device 10 (e.g., antenna 50W-1 may be disposed at or adjacent right side 36 whereas antenna 50W-2 is disposed at or adjacent left side 34 of device 10) to maximize spatial diversity for transceiver 66W. Antennas 50W-1 and 50W-2 may, for example, be mounted at opposing sides of nose bridge region 85.

The antennas 50A in device 10 may be mounted within device 10 and overlapping a lower region or area of peripheral edge portions 42 (e.g., antenna(s) 50A may be interposed between display 18A and bottom side 81 of device 10). Disposing antenna(s) 50A along the bottom edge of device 10 may serve to minimize the amount of conductive material in device 10 that lies between antenna(s) 50A and the location of earbuds 22R and 22L (FIG. 2) while device 10 is being worn by the user.

In implementations where device 10 includes a single antenna 50A, antenna 50A may convey radio-frequency signals 24A with both earbuds 22R and 22L (FIG. 2) through the dielectric material in CGA 28 and/or the top, bottom, right, left, and/or rear sides of device 10. Antenna 50A may be mounted at or adjacent the center of device 10. For example, antenna 50A may overlap nose bridge portion 85 of device 10 (e.g., antenna 50A may be disposed at the center of device 10 along the X-axis). This may allow antenna 50A to exhibit optimal and balanced channel conditions with both right earbud 22R at right side 36 of device 10 and left earbud 22L at left side 34 of device 10.

In implementations where device 10 includes multiple antennas 50A such as at least a first antenna 50A-L and a second antenna 50A-R, antenna 50A-R may be mounted at or adjacent to corner 74R of display 18A and/or corner 72R of device 10 (e.g., antenna 50A-R may be laterally interposed between corner 74R of display 18A and corner 72R of device 10). Antenna 50A-L may be mounted at or adjacent to corner 74L of display 18A and/or corner 72L of device 10 (e.g., antenna 50A-L may be laterally interposed between corner 74L of display 18A and corner 72L of device 10). In this way, display 18A may be vertically interposed between the antennas 50W (FIG. 9) and the antenna(s) 50A in device 10, thereby maximizing physical separation and thus isolation between antennas 50W and antenna(s) 50A.

Figure 9:
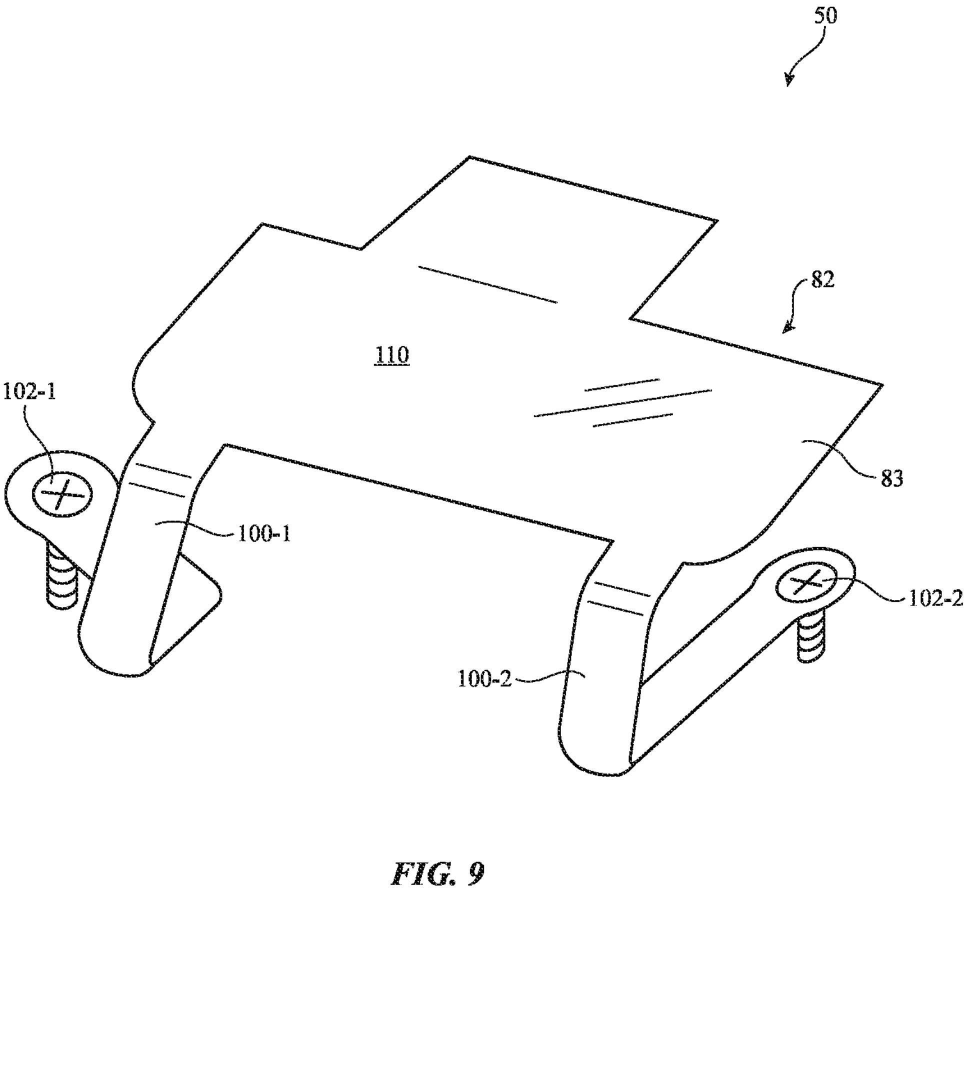
FIG. 9 is a perspective view of an illustrative flexible printed circuit of the type shown in FIG. 8 in accordance with some embodiments.

Device 10 may have a central longitudinal axis 70 extending from right side 36 to left side 34 (parallel to the X-axis and perpendicular to nose bridge region 85 of FIG. 9). If desired, antennas 50A-L and 50A-R (e.g., the lateral surfaces of antenna resonating elements 52 (FIG. 3) in antennas 50A-L and 50A-R) may be tilted at non-parallel and non-perpendicular angles with respect to longitudinal axis 70. When placed and oriented in this way, antenna 50A-R may exhibit optimal channel characteristics in conveying radio-frequency signals 24A-R with right earbud 22R (e.g., with minimal blockage by the user's head, display 18A, and/or the other conductive structures of device 10). Similarly, antenna 50A-L may exhibit optimal channel characteristics in conveying radio-frequency signals 24A-R with left earbud 22L (e.g., with minimal blockage by the user's head, display 18A, and/or the other conductive structures of device 10).

Figure 6:
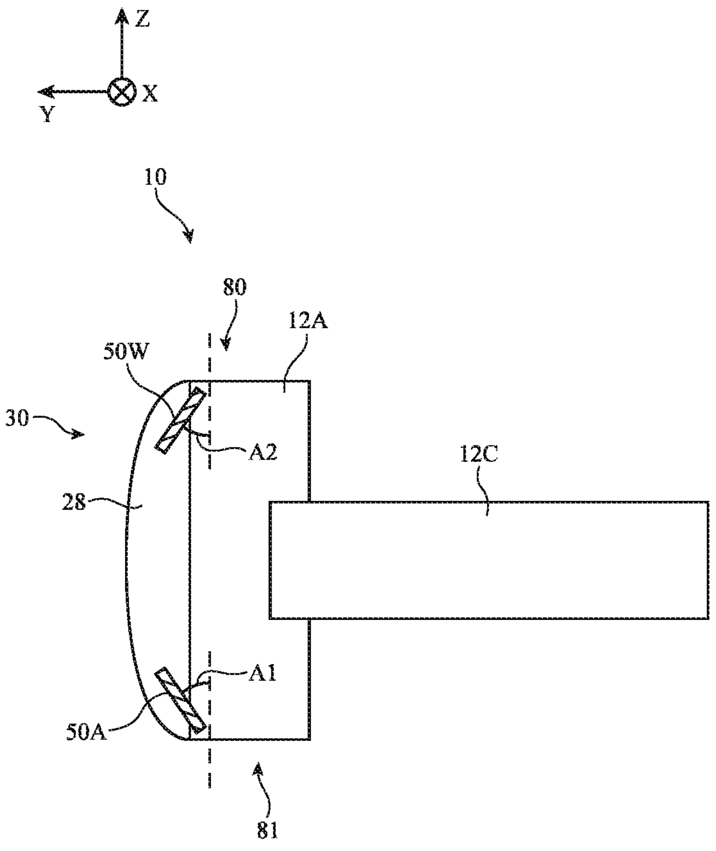
FIG. 6 is a side view of an illustrative electronic device having antennas disposed around the periphery of a cover glass assembly in accordance with some embodiments.

The example of FIG. 5 in which antennas 50W and 50A are mounted in device 10 at locations overlapping CGA 28 are merely illustrative. If desired, antennas 50W and/or 50A may be disposed within strap 12C of device 10 and/or at rear side 32 of device 10 (FIG. 2). FIG. 6 is a side view (e.g., taken in the direction of arrow 78 of FIG. 5) showing how antennas 50W and 50A may be disposed at front side 30 of device 10.

As shown in FIG. 6, an antenna 50W (e.g., antenna 50W-1 and/or antenna 50W-2 of FIG. 5) may be mounted at or adjacent to front side 30 and top side 80 of device 10. An antenna 50A (e.g., antenna 50A, antenna 50A-R, and/or antenna 50A-L of FIG. 5) may be mounted at or adjacent to front side 30 and bottom side 81 of device 10. Antenna 50W and antenna 50A may be pressed against, mounted to, mounted (e.g., embedded) within, printed on, adhered to, affixed to, or mounted adjacent to CGA 28.

Antenna 50W may be tilted, rotated, or oriented at a non-parallel and non-perpendicular angle A2 with respect to longitudinal axis 70 (FIG. 5), the rear side of device 10, and/or the X-Z plane. Angle A2 may be 45 degrees, 30-60 degrees, 1-30 degrees, 1-45 degrees, 5-35 degrees, or other angles. Similarly, antenna 50A may be tilted, rotated, or oriented at a non-parallel and non-perpendicular angle A1 with respect to longitudinal axis 70 (FIG. 5), the rear side of device 10, and/or the X-Z plane. Angle A1 may be 45 degrees, 30-60 degrees, 1-30 degrees, 1-45 degrees, 5-35 degrees, or other angles. Angle A1 may be equal to angle A2 or may be different from angle A2.

If desired, the lateral surface of the antenna resonating elements 52 (FIG. 3) in antennas 50W and 50A may extend parallel to the curved surface(s) of CGA 28 (e.g., the antenna resonating elements may exhibit the same compound curvature as CGA 28). This may serve to provide a uniform separation between all points on the lateral surface of the antenna resonating elements and the overlapping portions of CGA 28, which minimizes antenna impedance mismatch across the antenna resonating elements and thus maximizes antenna efficiency.

When placed and oriented in this way, antenna(s) 50A may exhibit optimal channel characteristics in conveying radio-frequency signals 24A with right earbud 22R and left ear bud 22L (e.g., with minimal blockage by the user's head, display 18A, and/or the other conductive structures of device 10). Mounting the antennas at the rear side of device 10 may subject the antennas to undesirable detuning when displays 18B (FIG. 2) move over time and/or due to impedance loading from the user's head. Mounting the antennas at front side 30 of device 10 (as shown in FIGS. 5 and 6) may minimize the impact of displays 18B (FIG. 2) on the antennas (e.g., such that movement of displays 18B does not detune the antennas). In addition, mounting the antennas at front side 30 of device 10 may minimize fading channel path loss, may minimize user-to-user variation in the impedance loading of the antennas by the user's head, and may minimize and the amount of radio-frequency energy exposure produced by the antennas on the user's body, helping device 10 to comply with regulatory limits on radio-frequency energy exposure or absorption (e.g., without requiring transmit power level backoffs for the antenna) while meeting the strict latency and glitch rate requirements of the ultra-low-latency audio communications protocol.

Figure 7:
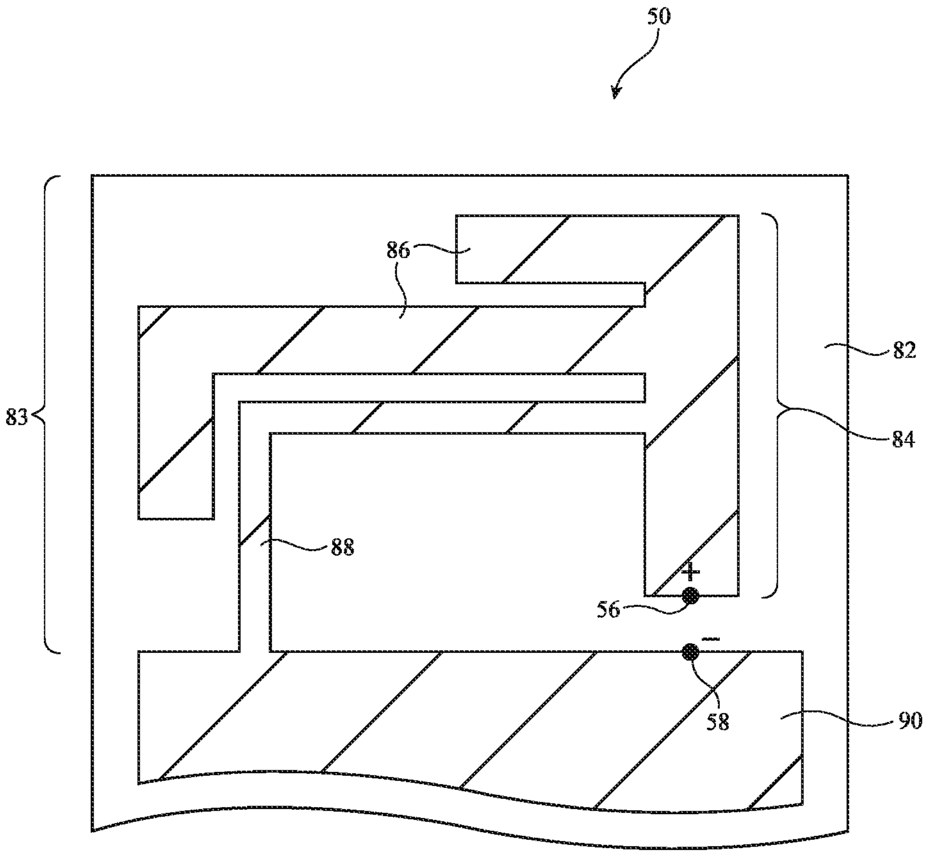
FIG. 7 is a top view of an illustrative antenna having conductive traces on a flexible printed circuit in accordance with some embodiments.

If desired, the antennas 50 in device 10 may be formed from conductive traces patterned onto an underlying substrate. FIG. 7 is a top view of showing how a given antenna 50 in device 10 (e.g., any of antennas 50W-1, 50W-2, 50A, 50A-R, or 50A-R of FIG. 5 or any other antenna 50 in device 10) may be formed from conductive traces patterned onto an underlying substrate.

As shown in FIG. 7, antenna 50 may include at least conductive traces 84 and 90 patterned onto an underlying dielectric substrate such as substrate 82. Substrate 82 may be a rigid printed circuit board, a flexible printed circuit, a glass substrate, a ceramic substrate, a plastic substrate, a polymer substrate, or any other desired substrate. Configurations in which substrate 82 is a flexible printed circuit are described herein as an example. Substrate 82 may therefore sometimes be referred to herein as flexible printed circuit 82 or flexible printed circuit board 82.

Flexible printed circuit 82 may include one or more vertically stacked layers of flexible printed circuit material (e.g., polyimide). Conductive traces may be patterned onto one or more of the layers. Conductive traces on different layers may be coupled together using conductive vias extending through the layers. As shown in FIG. 7, antenna 50 may include an antenna resonating element 52 (FIG. 3) formed from conductive traces 84 patterned onto a portion (region) 83 of flexible printed circuit 82. Antenna 50 may also include an antenna ground 54 (FIG. 3) that includes ground traces 90 patterned onto a different portion (e.g., one or more flexible printed circuit tails) of flexible printed circuit 82.

Conductive traces 84 may include zero, one, or more than one radiating arm 86. Each radiating arm 86 may have a corresponding length that configures antenna 50 to radiate in a corresponding range of frequencies. Antenna 50 may be fed by an antenna feed having a positive antenna feed terminal 56 coupled to conductive traces 84 (e.g., radiating arms 86) and a ground antenna feed terminal 58 coupled to ground traces 90. If desired, one or more of the radiating arms 86 may be coupled to ground traces 90 over grounding path 88 (sometimes referred to as grounding leg 88, return path 88, or short circuit path 88). Grounding path 88 may provide a path between radiating arm(s) 86 and ground traces 90 for the antenna currents conveyed by the antenna feed, which may serve to alter the frequency band(s) covered by the antenna and/or the lateral area spanned by the antenna.

The example of FIG. 7 is merely illustrative and, in general, there may be any desired number of radiating arms 86 or no radiating arms 86 in antenna 50 (e.g., in implementations where antenna 50 is a slot antenna or another type of antenna), radiating arms 86 may have any desired shapes and may follow any desired paths, conductive traces 84 may have any desired number of edges extending at any desired angles and following any desired straight and/or curved paths, etc.

The antenna ground 54 (FIG. 3) for antenna 50 may include other conductive structures in addition to ground traces 90. To extend the antenna ground beyond ground traces 90 to include the other conductive structures, device 10 may include one or more conductive interconnect structures that couple ground traces 90 to the other conductive structures. The conductive interconnect structures may include conductive screws, conductive pins, conductive clips, conductive springs, conductive adhesive, conductive foam, solder, welds, radio-frequency connectors, conductive brackets, conductive tape, conductive tabs, and/or any other desired conductive interconnects.

To optimize the wireless performance of antenna 50, care should be taken when grounding the antenna. For example, as much conductive material in the vicinity of the antenna should be held at the same ground (reference) potential as possible (e.g., forming antenna ground 54 of FIG. 3) to prevent the conductive material from undesirably detuning the antenna or blocking radio-frequency signals conveyed by the antennas. Conductive interconnect structures may be used to couple ground traces 90 on flexible printed circuit 82 to the conductive material to effectively extend the size of the antenna ground beyond ground traces 90.

Figure 8:
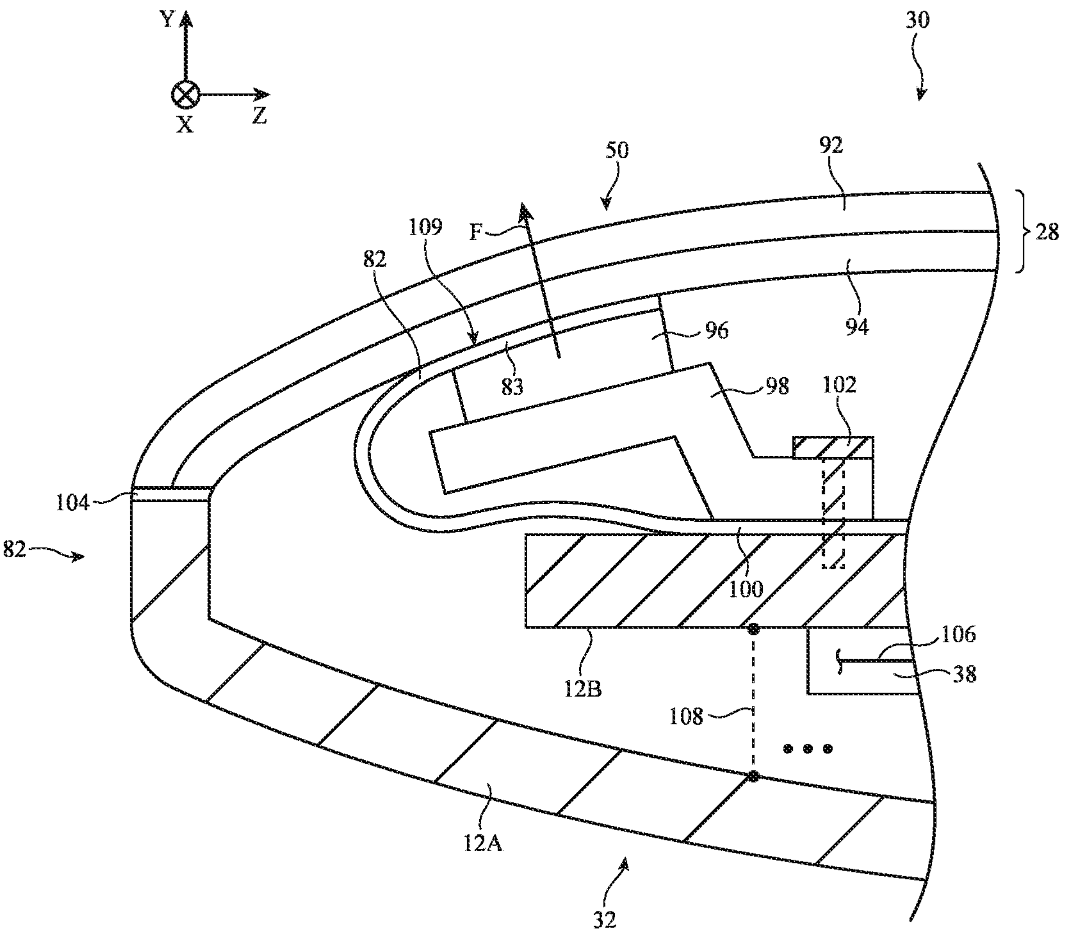
FIG. 8 is a cross-sectional side view of an illustrative electronic device having an antenna formed from conductive traces on a flexible printed circuit that is pressed against a display cover layer and that is grounded to an inner chassis in accordance with some embodiments.

FIG. 8 is a cross-sectional side view showing one example of how antenna 50 may be mounted at front side 30 of device 10 and grounded to nearby conductive structures such as inner chassis 12B. The configuration for antenna 50 in FIG. 8 may be used to implement antenna 50A of FIG. 5 (e.g., the cross-sectional side view of FIG. 8 may be taken along line BB' of FIG. 5), antenna 50A-L of FIG. 5, antenna 50A-R of FIG. 5, antenna 50W-1 of FIG. 5, antenna 50W-2 of FIG. 5, or any other desired antenna 50 in device 10.

As shown in FIG. 8, antenna 50 may be mounted at front side 30 of device 10 at a location overlapping peripheral edge portion 42 (FIG. 5) of CGA 28. CGA 28 may include an outermost layer such as cover glass layer 92. If desired, CGA 28 may also include a dielectric cover layer such as dielectric layer 94 on, at, or adjacent to the interior side of cover glass layer 92. While CGA 28 may have multiple dielectric layers 94 stacked under cover glass layer 92, a single dielectric layer 94 is shown in FIG. 8 for the sake of clarity.

Cover glass layer 92 may be formed from glass and may have a three-dimensional or compound curvature. For example, one or both lateral surfaces of cover glass layer 92 may have a three-dimensional or compound curvature (e.g., both lateral surfaces may extend parallel to each other, one lateral surface may exhibit a different curvature than the other lateral surface, both lateral surfaces may be non-developable surfaces, one lateral surface may be developable whereas the other is non-developable, etc.).

Dielectric layer 94 may have a three-dimensional or compound curvature or may have any other desired curvature(s). One or both lateral surfaces of dielectric layer 94 may have a three-dimensional or compound curvature (e.g., both lateral surfaces may extend parallel to each other, one lateral surface may exhibit a different curvature than the other lateral surface, both lateral surfaces may be non-developable surfaces, one lateral surface may be developable whereas the other is non-developable, etc.). Dielectric layer 94 may, for example, have the same curvature as cover glass layer 92 or may have a different curvature than cover glass layer 92. If desired, portions of one or both lateral surfaces of dielectric layer 94 and/or one or both surfaces of cover glass layer 92 may be planar, may have a non-compound curvature or a two-dimensional curvature, etc.

In the example of FIG. 8, dielectric layer 94 is shown as being layered onto (e.g., adhered or molded onto) the inner surface of cover glass layer 92 for the sake of clarity. However, if desired, some or all of the lateral area of dielectric layer 94 may be separated from cover glass layer 92 by an air gap (not shown) and/or one or more intervening structures or layers (not shown). The outer lateral surface of dielectric layer 94 may have the same curvature as cover glass layer 28 or a different curvature and the inner lateral surface of dielectric layer 94 may have the same curvature as cover glass layer 28 or a different curvature. The outer lateral surface of dielectric layer 94 may have the same curvature as the inner lateral surface of dielectric layer 94 (e.g., the inner and outer lateral surfaces may extend parallel to each other) or the outer lateral surface of dielectric layer 94 may have a different curvature than the inner lateral surface of dielectric layer 94 (e.g., the inner and outer lateral surfaces may be non-parallel).

Cover glass layer 92 may be formed from glass, sapphire, or other transparent materials. Cover glass layer 92 may be replaced with an outermost plastic cover layer if desired. Cover glass layer 92 may sometimes be referred to herein as cover layer 92, display cover layer 92, cover glass 92, layer 92, or exterior layer 92. Dielectric layer 94 may be formed from polymer, plastic, glass, ceramic, and/or other dielectric materials.

If desired, dielectric layer 94 may exhibit a dielectric constant that is lower than the dielectric constant of cover glass layer 92. This may configure dielectric layer 94 to form an impedance transition layer between air and cover glass layer 92 for the radio-frequency signals conveyed by antenna 50, helping to minimize signal reflections between the interior of device 10 and cover glass layer 92 and thus maximizing antenna efficiency. Dielectric layer 94 may also serve to limit radio-frequency exposure or absorption by external objects at the exterior of device 10, helping device 10 to satisfy regulatory requirements on radio-frequency energy exposure or absorption without backing off transmit power level.

If desired, dielectric layer 94 may include multiple plastic or polymer sub-layers that are molded, adhered, or coupled together. As one example, dielectric layer 94 may include a shroud having a ring-shaped trim portion that laterally surrounds the pixels in display 18A (e.g., that only extends around peripheral edge portions 42 of CGA 28 and that does not overlap central region 44 of CGA 28) and may include a canopy portion that is coupled/adhered to the shroud portion and that overlaps or covers the pixels of display 18A (e.g., that overlaps central region 44 of CGA 28). Dielectric layer 94 may sometimes also be referred to herein as dielectric member 94, dielectric cover layer 94, mask 94, shroud 94, trim 94, and/or canopy 94.

As shown in FIG. 8, CGA 28 may be mounted to outer chassis 12A using gasket 104. Gasket 104 may include conductive a ring of adhesive, an adhesive gasket, or any other desired material that affixes CGA 28 to outer chassis 12A. Outer chassis 12A and CGA 28 may surround an interior cavity of device 10. Inner chassis 12B may be mounted to outer chassis 12A within the interior cavity. If desired, conductive interconnect structures 108 may mount, affix, secure, attach, or otherwise mechanically and/or electrically couple inner chassis 12B to outer chassis 12A. Conductive interconnect structures 108 may include one or more rivets or screws, for example. Logic board 38 may be mounted to inner chassis 12B. Logic board 38 may include one or more ground structures such as ground traces 106.

Antenna 50 may be formed from conductive traces 84 and 90 (FIG. 7) patterned onto flexible printed circuit 82. Antenna 50 may be pressed against CGA 28. For example, as shown in FIG. 8, the portion 83 of flexible printed circuit 82 having conductive traces 84 of FIG. 7 (e.g., antenna resonating element 52 of FIG. 3) may be pressed against interior lateral surface 109 of dielectric layer 94 (e.g., within a peripheral edge portion 42 of CGA 28).

Mounting antenna 50 in device 10 in this way may configure portion 83 of flexible printed circuit 82 and thus the antenna resonating element for antenna 50 to exhibit the same curvature as dielectric layer 94 (e.g., a compound three-dimensional curvature). By exhibiting the same curvature, each point on the lateral area spanned by the antenna resonating element of antenna 50 is separated from CGA 28 by the same uniform distance, thereby forming a smooth impedance boundary from the antenna to CGA 28 across all of the antenna resonating element and minimizing the impact of the compound curvature of CGA 28 on the wireless performance of antenna 50.

Portion 83 of flexible printed circuit 82 may be attached to an underlying biasing member 96. Biasing member 96 may have a first surface that contacts flexible printed circuit 82 and an opposing second surface that is mounted to dielectric carrier 98. Dielectric carrier 98 (sometimes referred to herein as carrier 98, rigid carrier 98, rigid support 98, support structure 98, support member 98, or support 98) may be a plastic bracket or other rigid structure that is mounted to inner chassis 12B. Carrier 98 may be secured to inner chassis 12B by a fastener such as conductive interconnect structure 102 (e.g., one or more conductive screws). In this way, biasing member 96 may be secured in place relative to inner chassis 12B and outer chassis 12A.

Biasing member 96 may include a foam member (e.g., unidirectional structural foam), one or more springs, or any other desired biasing structures. When device 10 is assembled, biasing member 96 is slightly compressed, which establishes a restoring spring force F outwards against flexible printed circuit 82 and dielectric layer 94. Biasing member 96 may uniformly apply force F across the lateral area of portion 83 of flexible printed circuit 82 and thus the antenna resonating element for antenna 50. This may serve to maintain a strict spatial relationship and parallelism between the antenna resonating element in antenna 50 and CGA 28 even as device 10 is subject to wear or external force during use, thereby maintaining a clean and consistent gap and impedance transition between antenna 50 and CGA 28 across the lateral area of the antenna resonating element (e.g., given the compound curvature of CGA 28), minimizing signal reflection and maximizing antenna efficiency over the operating lifetime of device 10. In addition, mounting antenna 50 in device 10 in this way may place antenna 50 as close to the exterior of device 10 as possible, thereby maximizing the external field of view of the antenna (e.g., allowing the field of view to overlap the expected location of a corresponding earbud 22R or 22L).

To minimize the effect of the conductive material of inner chassis 12B on the performance of antenna 50, antenna 50 may be grounded to inner chassis 12B. For example, flexible printed circuit 82 may have a tail portion 100 that is folded or bent around biasing member 96 and carrier 98. Tail portion 100 may be sandwiched between carrier 98 and inner chassis 12B. Conductive interconnect structure 102 may secure tail portion 100 of flexible printed circuit 82 in place between carrier 98 and inner chassis 12B.

Conductive interconnect structure 102 may also serve to electrically couple ground traces 90 (FIG. 7) on flexible printed circuit 82 to inner chassis 12B. This may serve to extend the antenna ground 54 (FIG. 3) of antenna 50 to include both ground traces 90 and inner chassis 12B, thereby minimizing the effect of inner chassis 12B on the radio-frequency performance of antenna 50. If desired, ground traces 106 on logic board 38 may also be electrically coupled to inner chassis 12B, extending the antenna ground to also include ground traces 106.

FIG. 9 is a perspective view of printed circuit 82 of FIG. 8. As shown in FIG. 9, portion 83 of flexible printed circuit 82 may have a lateral surface 110 that is pressed against interior lateral surface 109 of CGA 28 (FIG. 8). Portion 83 of flexible printed circuit 82 may include conductive traces 84 (FIG. 7) and thus antenna resonating element 52 (FIG. 3) of antenna 50.

Flexible printed circuit 82 may have multiple tail portions 100 such as at least a first tail portion 100-1 and a second tail portion 100-2. Tail portions 100-1 and 100-2 may each include ground traces 90 (FIG. 7) of antenna 50. Tail portions 100-1 and 100-2 may wrap around carrier 98 (FIG. 8).

Tail portion 100-1 may be attached to inner chassis 12B (FIG. 8) using a first conductive interconnect structure 102-1 (e.g., a first conductive screw). Tail portion 100-2 may be attached to inner chassis 12B (FIG. 8) using a second conductive interconnect structure 102-2 (e.g., a second conductive screw). Conductive interconnect structure 102-1 may short the ground traces on tail portion 100-1 to inner chassis 12B. Conductive interconnect structure 102-2 may short the ground traces on tail portion 100-2 to inner chassis 12B. The example of FIG. 9 is merely illustrative and, in general, flexible printed circuit 82 may have other shapes, may have more than two tail portions 100 coupled to the inner chassis, may have one or more tail portions not coupled to the inner chassis, and/or may have only one tail portion 100.

In the example of FIG. 8, conductive interconnect structures 108 may extend the antenna ground for antenna 50 to also include outer chassis 12A (e.g., antenna 50 may be grounded to outer chassis 12A through inner chassis 12B). However, in practice, conductive interconnect structures 108 are located relatively far from antenna 50, which can cause outer housing 12A to undesirably detract from the radio-frequency performance of antenna 50. To mitigate these issues, antenna 50 may be grounded directly to outer chassis 12A.

Figure 10:
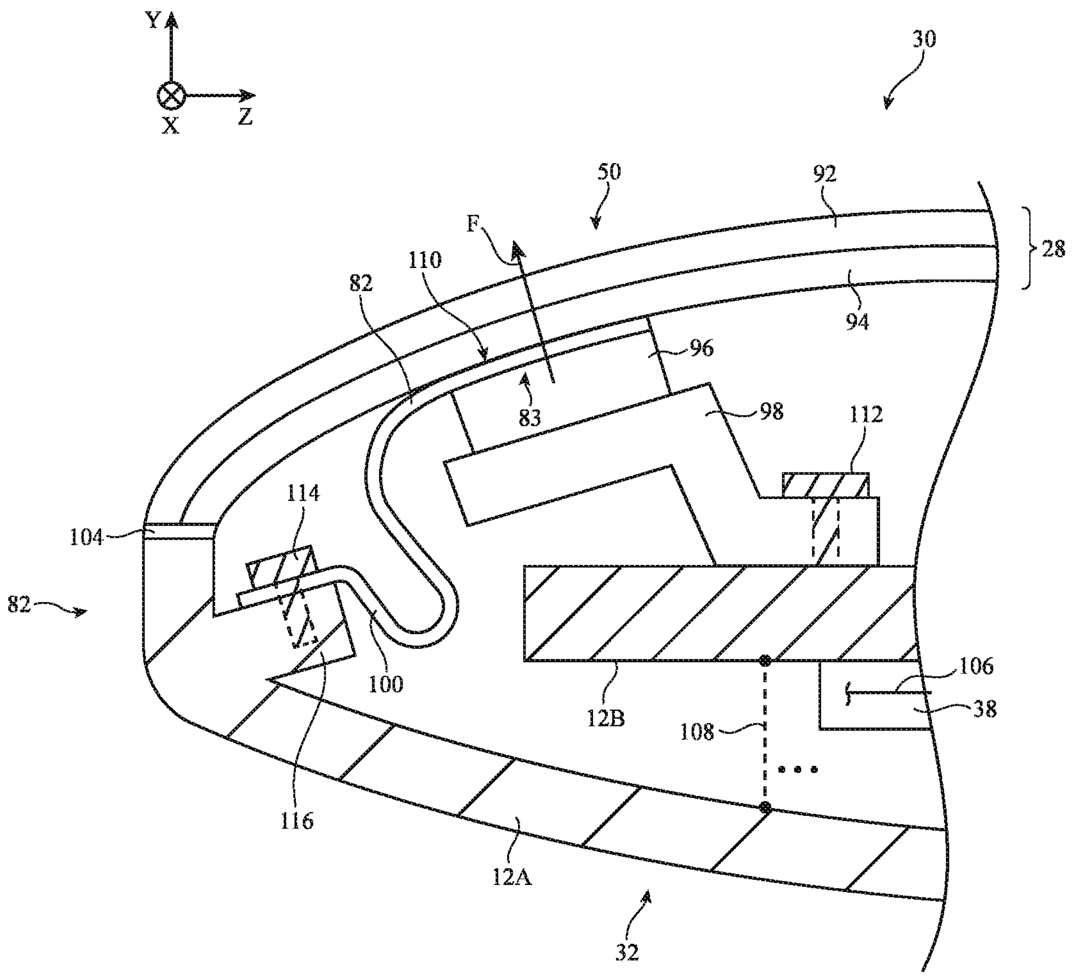
FIG. 10 is a cross-sectional side view of an illustrative electronic device having an antenna formed from conductive traces on a flexible printed circuit that is pressed against a display cover layer and that is grounded to an outer chassis in accordance with some embodiments.

FIG. 10 is a cross-sectional side view showing how antenna 50 may be grounded directly to outer chassis 12A. As shown in FIG. 10, lateral surface 110 of portion 83 of flexible printed circuit 82 may be pressed against the interior lateral surface of dielectric layer 94. One or more interconnect structures 112 may be used to attach carrier 98 to inner chassis 12B. Interconnect structures 112 need not be conductive in the example of FIG. 10, because interconnect structures 112 are not used to electrically ground antenna 50. Interconnect structures 112 may include screws, fasteners, clips, adhesive, tape, pins, springs, brackets, and/or any other desired mechanical interconnects.

On the other hand, tail portion(s) 100 of flexible printed circuit 82 may extend towards outer chassis 12A (e.g., rather than wrapping around carrier 98). One or more conductive interconnect structures 114 (e.g., conductive screws) may attach tail portion(s) 100 of flexible printed circuit 82 to portion 116 of outer chassis 12A. Portion 116 of outer chassis 12A may include one or more elongated metal members, conductive tabs, conductive screw bosses, conductive ledges, conductive standoffs, embossments, and/or any other desired portion of outer chassis 12A.

Conductive interconnect structures 114 may also serve to electrically couple ground traces 90 (FIG. 7) on flexible printed circuit 82 to outer chassis 12A. This may serve to extend the antenna ground 54 (FIG. 3) for antenna 50 to include both ground traces 90 and outer chassis 12A, thereby minimizing the effect of outer chassis 12A on the radio-frequency performance of antenna 50. Grounding antenna 50 directly to outer chassis 12A in this way may establish a direct grounding path from antenna 50 to the periphery of device 10, redistributing the antenna currents produced by antenna 50 onto outer chassis 12A. This may, for example, serve to alter the radiation pattern of antenna 50 to be oriented more towards the rear of device 10 and the expected locations of earbuds 22R and 22L (FIG. 2) than in implementations where antenna 50 is grounded directly to inner chassis 12B (FIG. 8).

Figure 11:
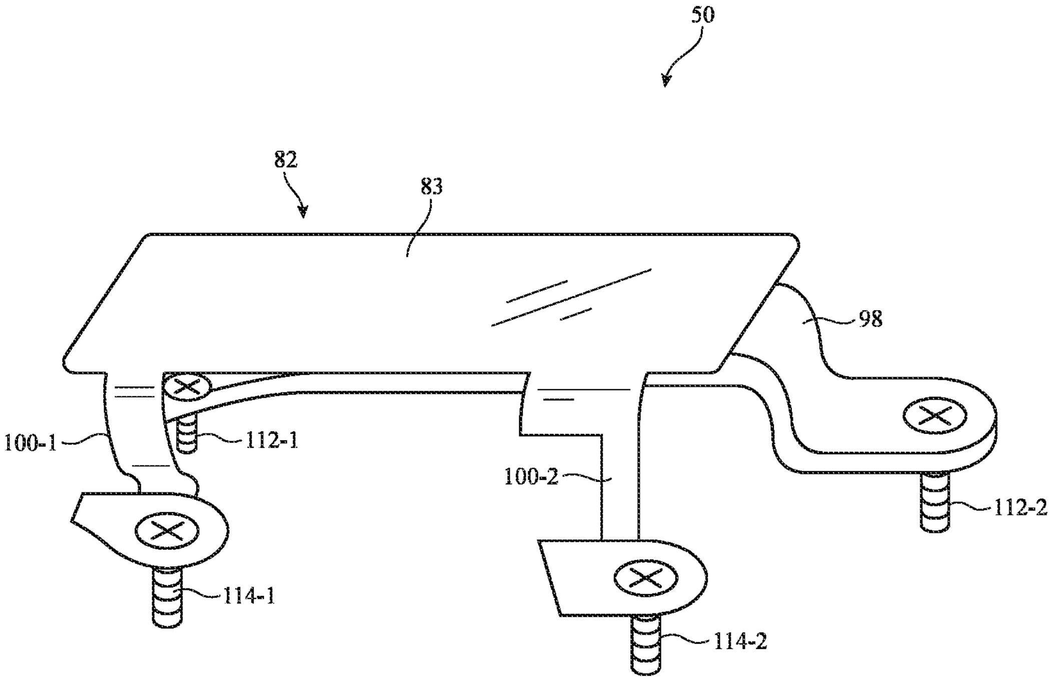
FIG. 11 is a perspective view of an illustrative flexible printed circuit of the type shown in FIG. 8 in accordance with some embodiments.

FIG. 11 is a perspective view of printed circuit 82 and the underlying carrier 98 of FIG. 10. As shown in FIG. 11, flexible printed circuit 82 may have tail portions 100-1 and 100-2 extending from portion 83. Tail portions 100-1 and 100-2 may each include ground traces 90 (FIG. 7) of antenna 50. Tail portion 100-1 may be attached to outer chassis 12A (FIG. 10) using a first conductive interconnect structure 114-1 (e.g., a first conductive screw). Tail portion 100-2 may be attached to outer chassis 12A (FIG. 10) using a second conductive interconnect structure 114-2 (e.g., a second conductive screw). Conductive interconnect structure 114-1 may short the ground traces on tail portion 100-1 to outer chassis 12A. Conductive interconnect structure 114-1 may short the ground traces on tail portion 100-1 to outer chassis 12A.

Carrier 98 may be secured to inner chassis 12B (FIG. 1) using one or more interconnect structures 112 such as at least a first interconnect structure 112-1 and a second interconnect structure 112-2. Interconnect structures 112-1 and 112-2 may fasten carrier 98 to inner chassis 12B at different points, thereby maximizing mechanical integrity.

If desired, the radio-frequency transmission line 60 (FIG. 3) for antenna 50 may extend under flexible printed circuit 82. The radio-frequency transmission line may include, for example, a coaxial cable having an inner (signal) conductor (e.g., signal conductor 62 of FIG. 3) that is soldered to conductive traces 84 (FIG. 7) on portion 83 of flexible printed circuit 82. The coaxial cable may also have an outer (ground) conductor (e.g., ground conductor 64 of FIG. 3) wrapped coaxially along the inner conductor. If desired, the outer conductor may be soldered to ground traces 90 (FIG. 7) at one or more locations at or along one or both of tail portions 100-1 and 100-2 of flexible printed circuit 82 (FIG. 11). This may help to form a strong grounding reference (e.g., ground antenna feed terminal 58 of FIG. 7) for the antenna nearby the positive antenna feed terminal.

The example of FIG. 10 in which antenna 50 is mechanically mounted to both inner chassis 12B (using biasing member 96, carrier 98, and interconnect structure 112) and outer chassis 12A is merely illustrative. If desired, antenna 50 may be mechanically mounted to outer chassis 12A but not inner chassis 12B. In these configurations, biasing member 96, carrier 98, and interconnect structure 112 may be omitted, as shown in the cross-sectional side view of FIG. 12.

Figure 12:
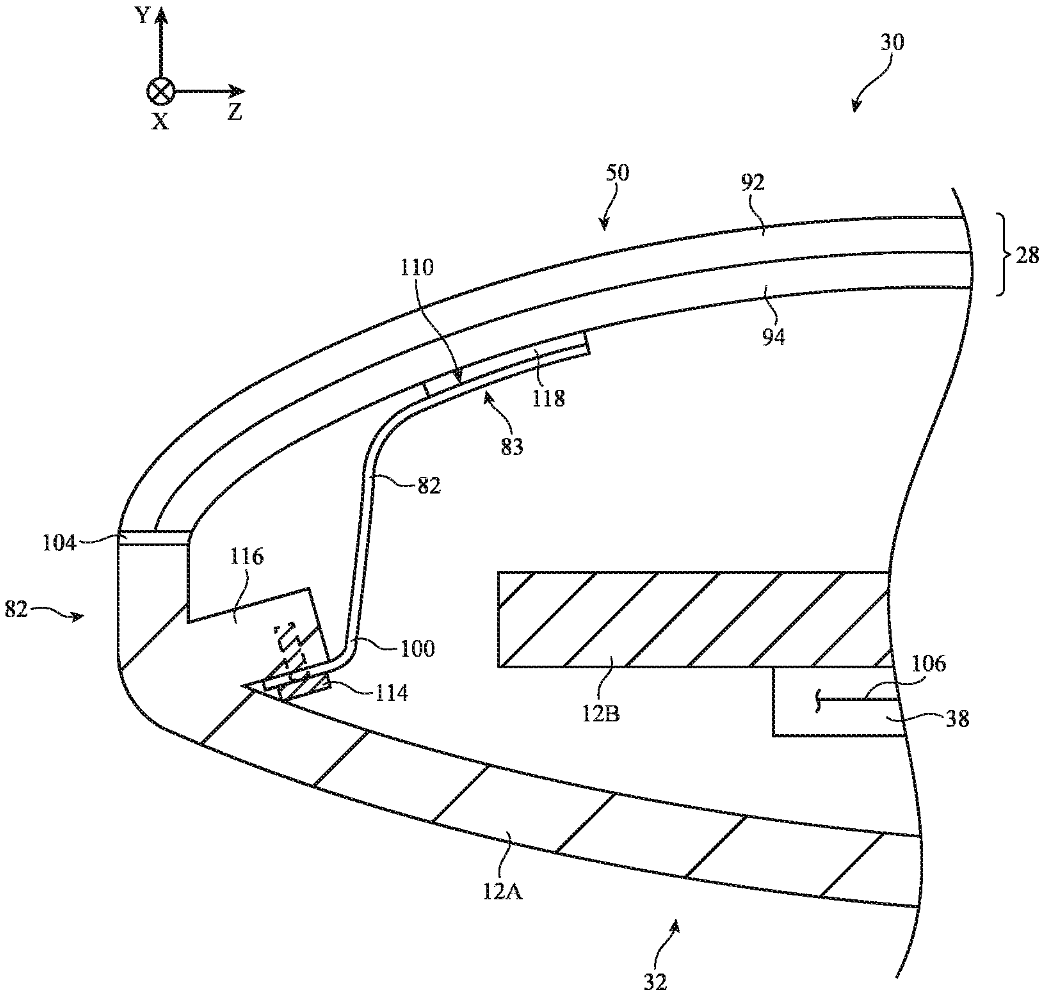
FIG. 12 is a cross-sectional side view of an illustrative electronic device having an antenna formed from conductive traces on a flexible printed circuit that is grounded to an outer chassis without mounting the flexible printed circuit to an inner chassis in accordance with some embodiments.

As shown in FIG. 12, an adhesive layer 118 may be used to attach lateral surface 110 of portion 83 of flexible printed circuit 82 to the interior lateral surface of dielectric layer 94. Adhesive layer 118 may include pressure sensitive adhesive, as one example. Adhesive layer 118 may help to ensure that each point on the antenna resonating element of antenna 50 is located at the same fixed spatial distance from dielectric layer 94 despite the compound curvature of CGA 28 (e.g., without requiring an additional biasing member such as biasing member 96 of FIG. 10).

The examples of FIGS. 8, 10, and 12 in which portion 83 of flexible printed circuit 82 is mounted or pressed against the interior surface lateral surface of dielectric layer 94 is illustrative and non-limiting. If desired, portion 83 of flexible printed circuit 82 may be embedded or molded within dielectric layer 94 itself.

Figure 13:
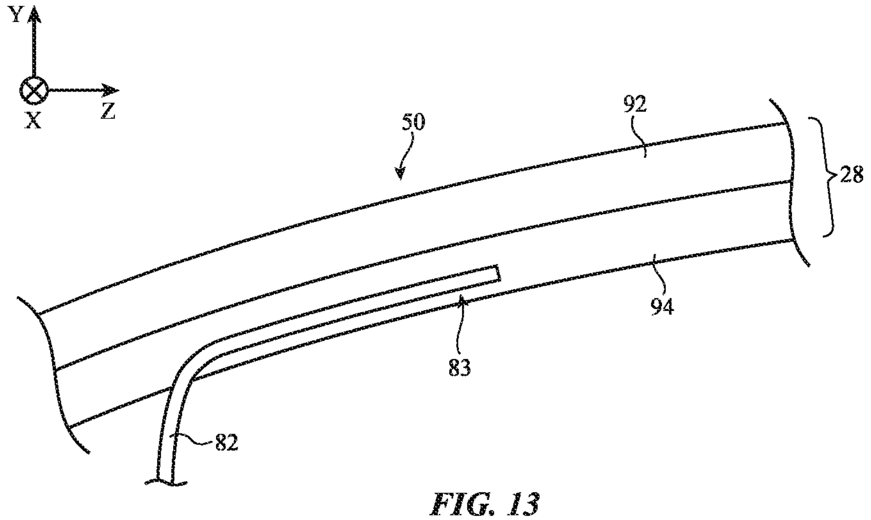
FIG. 13 is a cross-sectional side view showing how an illustrative antenna may be formed from a flexible printed circuit that is embedded within a cover glass assembly in accordance with some embodiments.

FIG. 13 is a cross-sectional side view of CGA 28 showing how portion 83 of flexible printed circuit 82 may instead by embedded within dielectric layer 94. As shown in FIG. 13, portion 83 of flexible printed circuit 82 may be embedded or over-molded within dielectric layer 94. The tail portion(s) of flexible printed circuit 82 may protrude out of dielectric layer 94 to couple flexible printed circuit 82 to the radio-frequency transmission line for antenna 50 and to the rest of the antenna ground.

Figure 14:
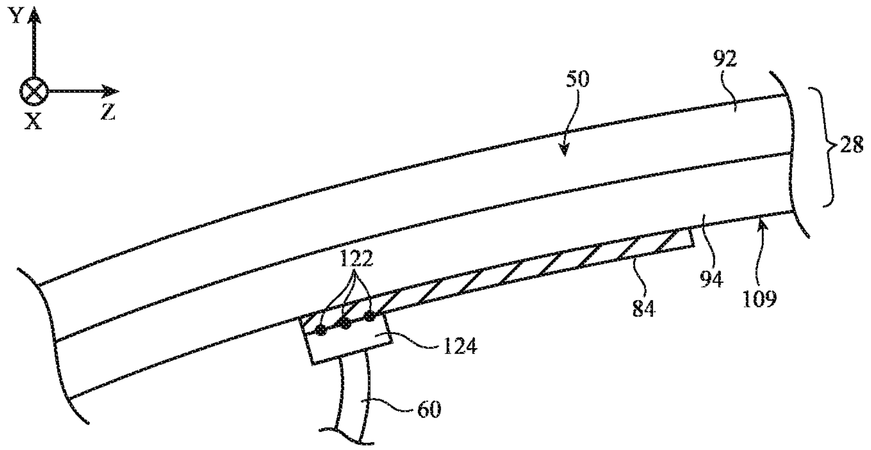
FIG. 14 is a cross-sectional side view showing how an illustrative antenna may be formed from conductive traces patterned onto a cover glass assembly in accordance with some embodiments.

If desired, flexible printed circuit 82 may be omitted and the conductive traces 84 used to from the antenna resonating element for antenna 50 (FIG. 7) may be patterned directly onto dielectric layer 94. FIG. 14 is a cross-sectional side view of CGA 28 showing how conductive traces 84 may be patterned directly onto dielectric layer 94.

As shown in FIG. 14, conductive traces 84 may be patterned directly onto interior lateral surface 109 of dielectric cover layer 94. Conductive traces 84 may, for example, be deposited on dielectric layer 94 using a laser direct structuring (LDS) process (e.g., conductive traces 84 may be LDS traces). The ground traces for antenna 50 (e.g., ground traces 90 of FIG. 7) may also be patterned directly onto dielectric layer 94 but have been omitted from FIG. 14 for the sake of clarity. The radio-frequency transmission line 60 for antenna 50 (e.g., a coaxial cable) may be coupled to antenna 50 using a radio-frequency connector 124 (e.g., a coaxial cable connector or another type of connector). Radio-frequency connector 124 may, for example, be soldered to conductive traces 84 using solder 122.

Figure 15:
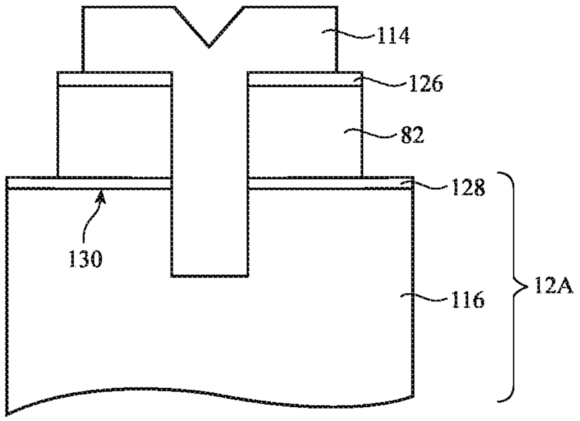
FIGS. 15 and 16 are cross-sectional side views showing how an illustrative flexible printed circuit having an antenna may be screwed to an outer chassis in accordance with some embodiments.

FIG. 15 is a cross-sectional side view showing how conductive interconnect structure 114 of FIGS. 10 and 12 may couple flexible printed circuit 82 to outer chassis 12A. As shown in FIG. 15, conductive interconnect structure 114 (e.g., conductive interconnect structure 114-1 or 114-2 of FIG. 11) may couple flexible printed circuit 82 (e.g., a corresponding tail portion 100 as shown in FIGS. 10-12) to portion 116 of outer chassis 12A.

Conductive interconnect structure 114 may, for example, include a conductive screw. The tail portion of flexible printed circuit 82 may be sandwiched between the head of the conductive screw and outer chassis 12A. Conductive interconnect structure 114 may electrically couple ground traces 90 (FIG. 7) on flexible printed circuit 82 to outer chassis 12A.

Flexible printed circuit 82 may have a first lateral surface facing outer chassis 12A and a second lateral surface opposite the first lateral surface. If desired, flexible printed circuit 82 may be provided with a first stiffener 128 layered onto the first lateral surface and/or a second stiffener 126 layered onto the second lateral surface. Stiffener 126 may contact the head of conductive interconnect structure (e.g., a conductive screw head). Stiffener 128 may contact portion 116 of outer chassis 12A.

Stiffeners 126 and 128 may be formed from conductive material and may help to form a reliable electrical grounding pad for conductive interconnect structure 114. Stiffeners 126 and 128 may also help to maximize assembly consistency for device 10. Stiffeners 126 and 128 may, for example, be formed from sheet metal such as stainless steel with a conductive coating (e.g., a nickel or gold coating), aluminum with de-anodized surfaces, or other metals. In implementations where outer chassis 12A is formed from aluminum, the surfaces 130 of portion 116 on outer chassis 12A may be de-anodized surfaces.

Figure 16:
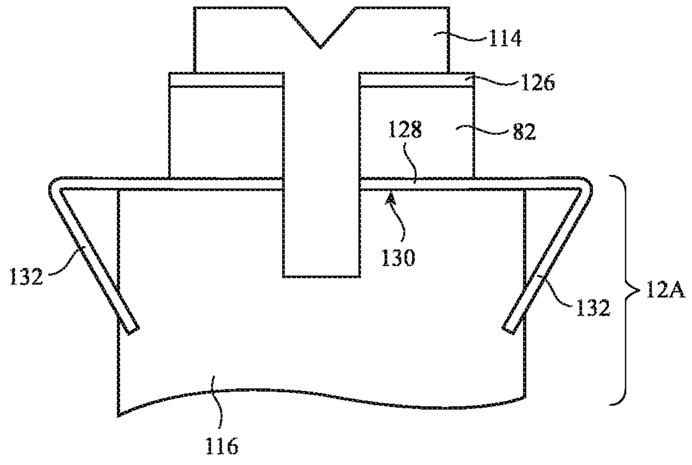

If desired, stiffener 128 may include one or more extensions 132 that are clipped onto portion 116 of outer chassis 12A, as shown in the example of FIG. 16. As shown in FIG. 16, extensions 132 may be folded downwards onto portion 116 of outer chassis 12A. If desired, extensions 132 may be pressed into and/or may bite/dig into one or more surfaces 130 of portion 116 of outer chassis 12A. This may help to secure flexible printed circuit 82 to outer housing 12A, may help to establish a strong and reliable electrical connection between the ground traces on flexible printed circuit 132 and outer chassis 12A, may help to maximize assembly consistency between devices, and/or may be used to maximize the positional stability of the flexible printed circuit to the outer chassis. Extensions 132 may, for example, include teeth, burs, pins, sharp edges, or other features cut into stiffener 128 and folded onto/into surfaces 130 of portion 116 of outer chassis 12A.

Figure 17:
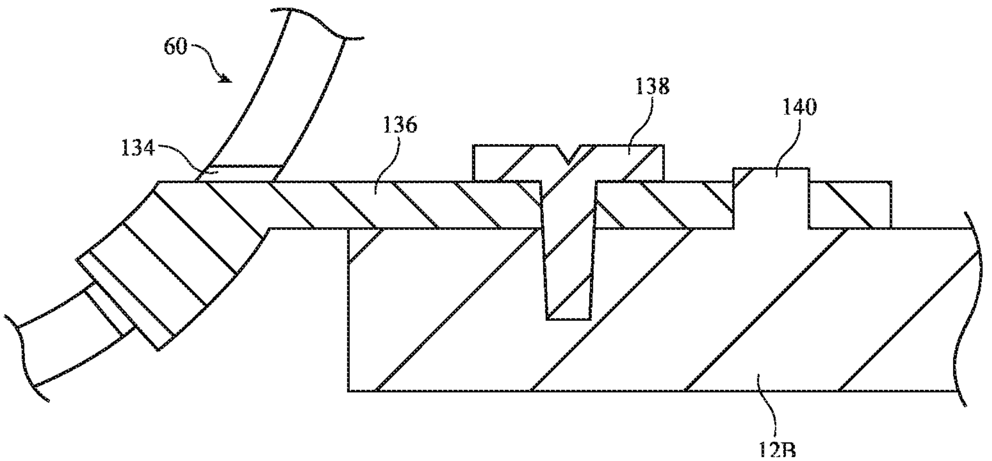
FIG. 17 is a side view showing how an illustrative coaxial cable for an antenna may be grounded to an inner chassis using a conductive bracket in accordance with some embodiments.

To reduce cable coupling, the ground conductor of the coaxial cable that feeds antenna 50 may be coupled to ground at one or more points near to antenna 50. FIG. 17 is a diagram showing how device 10 may include a grounding bracket that couples the ground conductor of the coaxial cable for antenna 50 to ground at one or more points near to antenna 50.

As shown in FIG. 17, the radio-frequency transmission line 60 for antenna 50 (e.g., a coaxial cable) may have a ferrule 134. Ferrule 134 may be a portion of coaxial cable in which the outer insulator of the coaxial cable has been removed, exposing the outer ground conductor of the cable. A conductive bracket such as grounding bracket 136 may have an end that is clamped onto the ground conductor of the coaxial cable at ferrule 134. Grounding bracket 136 may couple ferrule 134 and the ground conductor to inner chassis 12B.

If desired, inner chassis 12B may have one or more alignment features 140 (e.g., alignment pins) that help to hold grounding bracket 136 in place. One or more conductive interconnect structures 138 (e.g., a conductive screw) may attach grounding bracket 136 and thus the coaxial cable to inner chassis 12B. Conductive interconnect structure 138 may also serve to electrically couple ferrule 134 and the ground conductor to inner chassis 12B, thereby grounding radio-frequency transmission line 60 to inner chassis 12B.

Grounding bracket 136 may be formed from stainless steel (e.g., sheet metal) and may, if desired, be provided with a conductive coating such as a nickel or gold coating to enhance the electrical conductivity of the grounding bracket. The surface of inner chassis 12B that contacts grounding bracket 136 may be de-anodized if desired. Grounding bracket 136 may be coupled to radio-frequency transmission line 60 at, adjacent, or near to the antenna feed for antenna 50 (e.g., at, overlapping, or near to portion 83 of printed circuit 82).

Figure 18:
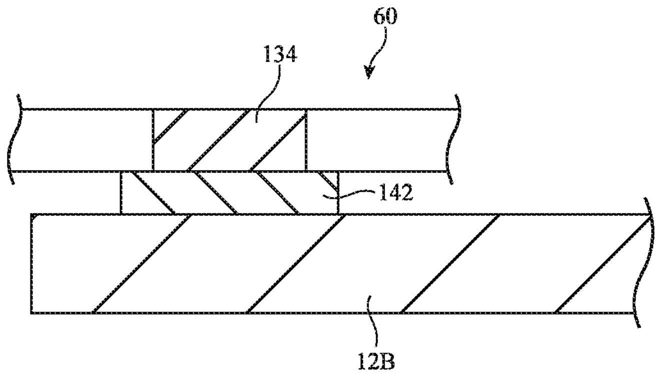
FIG. 18 is a side view showing how an illustrative coaxial cable for an antenna may be grounded to an inner chassis using conductive foam in accordance with some embodiments.

The example of FIG. 17 in which grounding bracket 136 grounds ferrule 134 to inner chassis 12B is illustrative and non-limiting. If desired, grounding bracket 136 may be replaced with conductive foam, as shown by conductive foam 142 of FIG. 18. Conductive foam 142 may electrically couple ferrule 134 and the ground conductor on the coaxial cable to inner chassis 12B. If desired, conductive foam 142 may be replaced with any desired features (e.g., conductive members, conductive brackets, etc.) that can be coupled to or embedded within inner chassis 12B to optimize the connection to ground.

The examples of FIGS. 8, 10, and 12 in which antenna 50 is shown as being grounded directly to inner chassis 12B or outer chassis 12A are illustrative and non-limiting. If desired, antenna 50 may be directly grounded to both inner chassis 12B and outer chassis 12A (e.g., the arrangements of FIGS. 8, 10, and 12 may be combined, flexible printed circuit 82 may include at least a first tail portion 100 grounded to outer chassis 12A and a second tail portion grounded to inner chassis 12B, etc.).

If care is not taken, the presence of conductive structures in CGA 28 may undesirably limit the radio-frequency performance for one or more antennas 50 in device 10. To mitigate these issues, conductive interconnect structures may also be used to ground the conductive structures in CGA 28 (e.g., to extend the antenna ground to also include the conductive structures in CGA 28).

Figure 19:
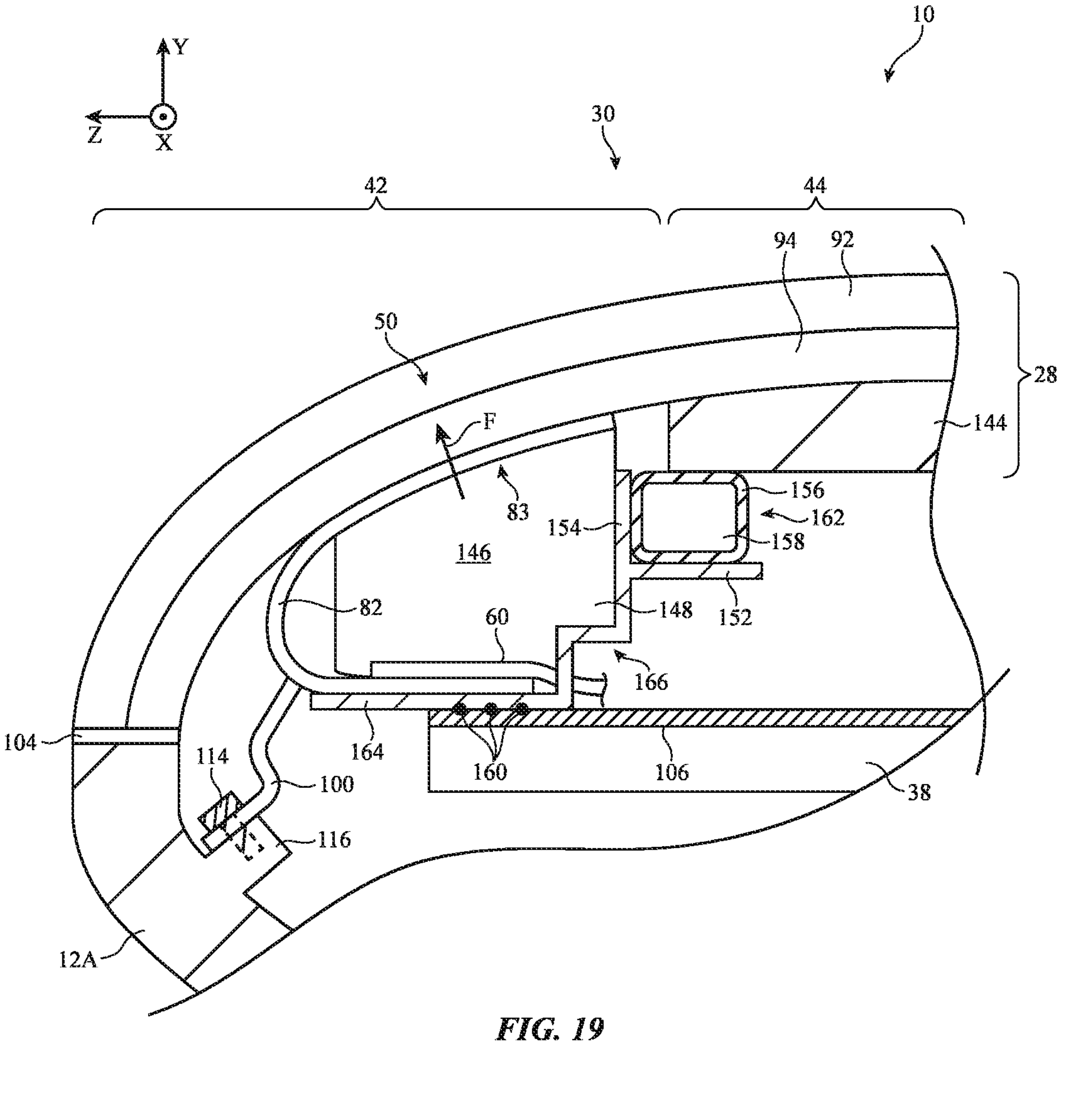
FIG. 19 is a cross-sectional side view of an illustrative electronic device having an antenna that is backed by a conductive cavity and grounded to an outer chassis and conductive structures in a cover glass assembly in accordance with some embodiments.

FIG. 19 is a cross-sectional side view showing one example of how antenna 50 may be mounted at front side 30 of device 10 and grounded to conductive structures in CGA 28. The configuration of antenna 50 in FIG. 19 may be used to implement antenna 50W-2 of FIG. 5 (e.g., the cross-sectional side view of FIG. 19 may be taken along line CC' of FIG. 5), antenna 50W-1 of FIG. 5, antenna 50A of FIG. 5, 50A-L of FIG. 5, antenna 50A-R of FIG. 5, or any other desired antenna in device 10.

As shown in FIG. 19, CGA 28 may include conductive structures 144. Conductive structures 144 may at least partially overlap central region 44 of CGA 28. Antenna 50 may be mounted within device 10 and overlapping peripheral edge portion 42 of CGA 28. Conductive structures 144 may, for example, include ground traces and/or other ground structures for display 18A (FIGS. 2 and 5). Conductive structures 144 may sometimes be referred to herein as conductive display structures 144.

While conductive display structures 144 are shown as being layered onto the interior lateral surface of dielectric layer 94 in FIG. 19 for the sake of clarity, conductive display structures 144 may located anywhere in CGA 28 (e.g., may be distributed between multiple dielectric layers 94, may be interposed between glass cover layer 92 and dielectric layer 94, may be layered onto the interior lateral surface of dielectric layer 94, may include ground traces on a flexible printed circuit or other circuit board for display 18A, may ground traces for the pixels of display 18A, and/or may include any other desired conductive material at any desired locations in CGA 28).

Flexible printed circuit 82 may be mounted to an underlying conductive cavity 166 (sometimes referred to herein as conductive can 166 or antenna can 166). Conductive cavity 166 may be formed from one or more sheet metal members or layers that are folded around a spatial cavity or volume, sometimes referred to herein as antenna cavity 146. The conductive material of conductive cavity 166 defines or forms the walls/edges of antenna cavity 146. Conductive cavity 166 may form a conductive cavity-back for antenna 50 (e.g., antenna 50 may be a cavity-backed antenna having an antenna resonating element formed from conductive traces on flexible printed circuit 82, backed by antenna cavity 146 and conductive cavity 166).

Antenna cavity 146 may have edges (walls) defined by conductive cavity 166 and the conductive traces on flexible printed circuit 82. For example, antenna cavity 146 may have a rear edge defined by rear wall 164 of conductive cavity 166, may have one or more side edges defined by one or more sidewalls 154 of conductive cavity 166, and may have an upper edge defined by the conductive traces in flexible printed circuit 82.

Sidewalls 154 of conductive cavity 166 may be folded upwards away from rear wall 164 and towards portion 83 of flexible printed circuit 82 and CGA 28. Rear wall 164 of conductive cavity 166 may be mounted to logic board 38. One or more of sidewalls 154 may have a protruding ledge portion such as ledge 152 extending away from antenna cavity 146. A conductive interconnect structure 162 may couple conductive cavity 166 to conductive display structures 144. Conductive interconnect structure 162 may include, for example, a conductive gasket having an inner dielectric substrate 158 such as foam or air and having a conductive outer coating 156 such as conductive adhesive, mesh, or fabric. Conductive interconnect structure 162 may include a conductive air loop gasket (ALG), as one example.

Conductive outer coating 156 may serve to electrically couple conductive cavity 166 to conductive display structures 144. Conductive outer coating 156 may also help to mechanically attach conductive cavity 166 to conductive display structures 144. Dielectric substrate 158 may apply a biasing force against conductive cavity 166 and/or conductive display structures 144 to help ensure that a reliable electrical connection is maintained between conductive cavity 166 and conductive display structures 144 over time. If desired, solder or welds may be used to help secure conductive cavity 166 to conductive interconnect structure 162, to help secure conductive interconnect structure 162 to conductive display structure 144, and/or to connect conductive cavity 166 directly to conductive display structures 144 (e.g., conductive interconnect structures 162 may be omitted if desired).

If desired, a support structure such as support 148 may be disposed within antenna cavity 146 (e.g., support 148 may fill some or all of antenna cavity 146). Support 148 may be formed from plastic, foam, or other materials. Portion 83 of flexible printed circuit 82 may be layered onto the upper surface of support 148 (e.g., portion 83 of flexible printed circuit 82 may be interposed between support 148 and dielectric layer 94). If desired, support 148 may be a biasing member that applies force F onto portion 83 of flexible printed circuit 82 to press portion 83 of flexible printed circuit 82 against the interior lateral surface of dielectric layer 94. Support 148 may sometimes also be referred to herein as support structure 148, dielectric carrier 148, carrier 148, antenna carrier 148, or biasing member 148.

Flexible printed circuit 82 may wrap around antenna cavity 146. If desired, a portion or end of flexible printed circuit 82 may extend into antenna cavity 146 and may overlap rear wall 164 of conductive cavity 166 (e.g., between support 148 and rear wall 164). Radio-frequency transmission line 60 may extend into antenna cavity 146 along flexible printed circuit 82. The ground conductor of radio-frequency transmission line 60 may be coupled to the ground traces 90 on flexible printed circuit 82 (FIG. 7) and/or to conductive cavity 166 at one or more points within antenna cavity 146 (e.g., using solder, conductive adhesive, conductive foam, a grounding bracket, etc.).

The ground traces 90 on flexible printed circuit 82 (FIG. 7) may be coupled to rear wall 164 of conductive cavity 166 (e.g., using solder, conductive adhesive, conductive foam, a grounding bracket, etc.). The ground traces may also extend into one or more tail portions 100 of flexible printed circuit 82. One or more conductive interconnect structures 114 may attach tail portion(s) 100 of flexible printed circuit 82 to portion 116 of outer chassis 12A. Conductive interconnect structure(s) 114 may short the ground traces in flexible printed circuit 82 to outer chassis 12A.

Conductive cavity 166 may be electrically coupled to ground traces 106 in logic board 38. Rear wall 164 of conductive cavity 166 may, for example, be surface-mounted to ground traces 106 on logic board 38 using solder 160. In this way, antenna 50 may be grounded to conductive cavity 166, ground traces 106 on logic board 38, outer chassis 12A, and conductive display structures 144 (e.g., ground traces 90 on flexible printed circuit 82 (FIG. 7), conductive cavity 166, conductive traces 106 on logic board 38, outer chassis 12A, and conductive display structures 144 may collectively form the antenna ground 54 (FIG. 3) for antenna 50). This may serve to optimize the radiation pattern and antenna efficiency for antenna 50 despite the presence of nearby conductive components such as conductive display structures 144 and outer chassis 12A.

In addition to establishing a large and uniform antenna ground for antenna 50, conductive cavity 166 and conductive interconnect structure 162 may help reflect the radio-frequency signals conveyed by antenna 50, which may serve to redirect or focus the radio-frequency signals (e.g., helping to boost the gain and efficiency of the antenna), may help to optimize the shape of the radiation pattern of antenna 50 and/or the field of view of antenna 50, and/or may help to shield antenna 50 from electromagnetic interference from other components or antennas in device 10. If desired, one or more dimensions of conductive cavity 166 (antenna cavity 146) may be selected to establish the boundary conditions of one or more electromagnetic resonant modes antenna cavity 146 (sometimes referred to herein as cavity modes) that help to contribute to the frequency response of antenna 50. In these configurations, the conductive traces on flexible printed circuit 82 may excite the electromagnetic resonant modes of antenna cavity 146 and the antenna resonating element 52 (FIG. 3) for antenna 50 may be formed from both the conductive traces on flexible printed circuit 82 and antenna cavity 146.

Figure 20:
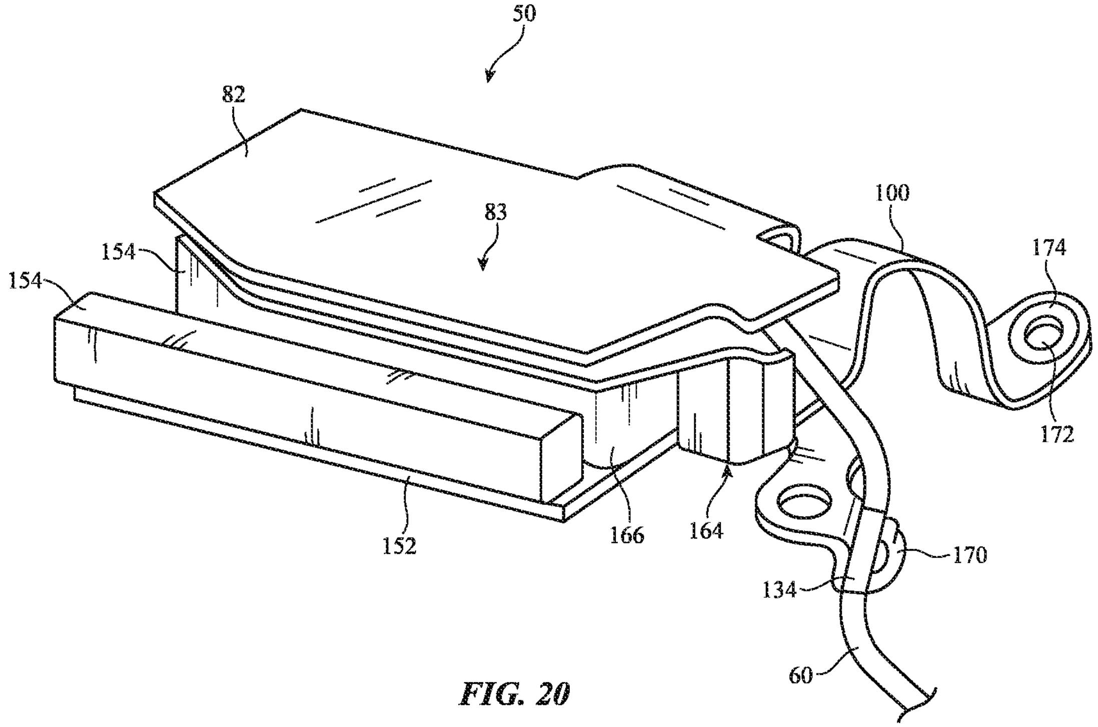
FIG. 20 is a perspective view of an illustrative antenna of the type shown in FIG. 19 in accordance with some embodiments.

FIG. 20 is a perspective view of antenna 50 of FIG. 19. In the example of FIG. 19, CGA 28, outer chassis 12A, support 148, and logic board 38 have been omitted for the sake of clarity. As shown in FIG. 20, portion 83 of flexible printed circuit 82 may wrap upwards and over antenna cavity 146 opposite rear wall 164. Sidewalls 154 may extend from rear wall 164 towards portion 83 of flexible printed circuit 82. Sidewalls 154, rear wall 164, and flexible printed circuit 82 may surround antenna cavity 146 (FIG. 19).

Ledge 152 may extend from a corresponding sidewall 154 of conductive cavity 166. Conductive interconnect structure 154 may be mounted to ledge 152. Radio-frequency transmission line 60 (e.g., a coaxial cable) may extend into the antenna cavity to feed antenna 50. Conductive cavity 166 may include one or more conductive clips such as conductive clip 170. Each conductive clip 170 may help to mechanically hold the coaxial cable in place and may electrically couple a respective ferrule 134 of the coaxial cable to conductive cavity 166 and thus the antenna ground for antenna 50 (e.g., at one or more locations close to or within the antenna cavity). Conductive clip 170 may be replaced with conductive adhesive, conductive foam, solder, and/or any other desired conductive interconnect structures.

One or more tail portions 100 of flexible printed circuit 82 may extend away from conductive cavity 166. Tail portion 100 may have an opening (hole) 172 and a stiffener 174 (e.g., stiffeners such as stiffeners 126 and/or 128 of FIGS. 15 and 16). Opening 172 may receive a corresponding conductive interconnect structure 114 (FIG. 19) that secures tail portion 100 to outer chassis 12A and that electrically couples the ground traces on flexible printed circuit 82 to the outer chassis. The example of FIG. 20 is merely illustrative and, in general, conductive cavity 166 and flexible printed circuit 82 may have other shapes.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a conductive housing;

a dielectric cover mounted to the conductive housing and having a compound curvature;

an antenna having an antenna resonating element mounted against the dielectric cover and having a ground trace, the antenna being configured to radiate through the dielectric cover; and a conductive interconnect that couples the ground trace to the conductive housing.

2. The electronic device of claim 1, further comprising:

a flexible printed circuit, wherein the ground trace is on the flexible printed circuit and the antenna resonating element includes conductive traces on a portion of the flexible printed circuit, wherein the flexible printed circuit has a tail and the conductive interconnect attaches the tail to the conductive housing.

3. The electronic device of claim 2, further comprising:

a first stiffener on a first lateral surface of the tail of the flexible printed circuit; and a second stiffener on a second lateral surface of the tail of the flexible printed circuit, the conductive interconnect comprising a conductive screw that extends through the first stiffener, the tail of the flexible printed circuit, and the second stiffener.

4. The electronic device of claim 3, further comprising:

a screw boss on the conductive housing and configured to receive the conductive screw, wherein the second stiffener comprises an extension that is folded onto a surface of the screw boss.

5. The electronic device of claim 1, further comprising:

a conductive frame, wherein the conductive housing surrounds a lateral periphery of the conductive frame;

a dielectric carrier mounted to the conductive frame; and foam on the dielectric carrier, wherein the foam is configured to press a portion of the antenna resonating element against the dielectric cover.

6. The electronic device of claim 5, further comprising:

a conductive rivet that attaches the conductive frame to the conductive housing;

a head strap coupled to the conductive housing;

a first display mounted to the conductive frame and configured to display a left image;

a second display mounted to the conductive frame and configured to display a right image; and a third display mounted to the dielectric cover and configured to display an image through the dielectric cover.

7. The electronic device of claim 6, wherein the third display includes conductive display structures, the electronic device further comprising:

a conductive cavity formed from folded sheet metal, wherein the portion of the antenna resonating element overlaps the conductive cavity, the conductive cavity is electrically coupled to the ground trace, and the conductive cavity is electrically coupled to the conductive display structures.

8. The electronic device of claim 7, further comprising a conductive gasket that couples the conductive cavity to the conductive display structures.

9. The electronic device of claim 7, further comprising:

a biasing member disposed in the conductive cavity and configured to press the portion of the flexible printed circuit against the dielectric cover.

10. The electronic device of claim 1, wherein the dielectric cover comprises an outer glass layer having the compound curvature and a dielectric layer between the antenna resonating element and the outer glass layer, the antenna resonating element comprising a conductive trace patterned onto an interior surface of the dielectric layer.

11. The electronic device of claim 10, further comprising:

a radio-frequency connector soldered to the conductive trace; and a coaxial cable coupled to the radio-frequency connector.

12. The electronic device of claim 1, wherein the dielectric cover comprises a glass layer having the compound curvature, the electronic device further comprising:

a plastic layer overlapping the glass layer.

13. The electronic device of claim 12, wherein the antenna resonating element is molded within the plastic layer.

14. The electronic device of claim 1, wherein the compound curvature has a first non-zero radius of curvature about a first axis and has a second non-zero radius of curvature about a second axis that is non-parallel to the first axis.

15. An electronic device comprising:

a conductive outer chassis;

a conductive inner chassis, the conductive inner chassis being mounted to the conductive outer chassis and the conductive outer chassis extending around a lateral periphery of the conductive inner chassis;

a cover mounted to the conductive outer chassis and having a three-dimensional curvature;

a flexible printed circuit;

an antenna having an antenna resonating element on a first portion of the flexible printed circuit and having a ground trace on a second portion of the flexible printed circuit, the antenna being configured to radiate through the cover; and a rigid support mounted to the conductive inner chassis using a conductive interconnect, wherein the conductive interconnect electrically couples the ground trace to the conductive inner chassis.

16. The electronic device of claim 15, further comprising:

a biasing member mounted to the rigid support and configured to press the first portion of the flexible printed circuit against the cover.

17. The electronic device of claim 15, further comprising:

a conductive rivet that attaches the conductive outer chassis to the conductive inner chassis;

a head strap coupled to the conductive outer chassis;

a logic board mounted to the conductive inner chassis;

a first display mounted to the logic board and configured to display a left image;

a second display mounted to the logic board and configured to display a right image; and a third display mounted to the cover and configured to display an image through the cover.

18. A head-mounted device comprising:

a first conductive chassis;

a logic board mounted to the first conductive chassis;

first and second displays mounted to the logic board and configured to display respective left and right images;

a second conductive chassis that extends around the first conductive chassis and the logic board;

a cover mounted to the second conductive chassis opposite the first and second displays, the cover having a third display configured to display images through the cover;

a conductive can mounted to the logic board, wherein the conductive can is electrically coupled to a conductive structure in the third display; and an antenna having an antenna resonating element interposed between the conductive can and having an antenna ground that includes the conductive can and the conductive structure in the third display.

19. The head-mounted device of claim 18, further comprising:

a flexible printed circuit, wherein the antenna resonating element is disposed on the flexible printed circuit and the antenna ground comprises a ground trace disposed on the flexible printed circuit; and a conductive screw that attaches the flexible printed circuit to the second conductive chassis and that electrically couples the ground trace to the second conductive chassis.

20. The head-mounted device of claim 18, wherein the conductive can has a rear wall opposite the antenna resonating element, a sidewall extending from the rear wall towards the cover, and a ledge that extends away from a volume between the conductive can and the antenna resonating element, the electronic device further comprising:

a conductive gasket that is mounted to the conductive ledge and that electrically couples the conductive can to the conductive structure in the third display.

* * * * *